US007472084B2

(12) United States Patent
Damschroder

(10) Patent No.: US 7,472,084 B2
(45) Date of Patent: Dec. 30, 2008

(54) METHOD AND APPARATUS FOR CREATING AND MANAGING A VISUAL REPRESENTATION OF A PORTFOLIO AND DETERMINING AN EFFICIENT ALLOCATION

(75) Inventor: James Eric Damschroder, Chicago, IL (US)

(73) Assignee: Gravity Investments, LLC, Ft. Collins, CO (US)

( * ) Notice: Subject to any disclaimer, the term of this patent is extended or adjusted under 35 U.S.C. 154(b) by 1362 days.

(21) Appl. No.: 10/223,069

(22) Filed: Aug. 16, 2002

(65) Prior Publication Data

US 2003/0088492 A1     May 8, 2003

Related U.S. Application Data

(60) Provisional application No. 60/312,711, filed on Aug. 16, 2001.

(51) Int. Cl.
   *G06Q 40/00*     (2006.01)
(52) U.S. Cl. ....................................... 705/35; 705/36 R
(58) Field of Classification Search ............. 705/35–45, 705/27
   See application file for complete search history.

(56) References Cited

U.S. PATENT DOCUMENTS

| | | | |
|---|---|---|---|
| 4,953,085 A | 8/1990 | Atkins | 364/408 |
| 5,077,661 A | 12/1991 | Jain et al. | 364/402 |
| 5,148,365 A | 9/1992 | Dembo | |
| 5,185,696 A | 2/1993 | Yoshino et al. | 364/408 |
| 5,220,500 A * | 6/1993 | Baird et al. | 705/36 R |
| 5,245,535 A | 9/1993 | Weiss et al. | 364/407 |
| 5,343,388 A | 8/1994 | Wedelin | 364/402 |
| 5,454,104 A | 9/1995 | Steidlmayer et al. | |
| 5,644,727 A | 7/1997 | Atkins | 395/240 |
| 5,689,651 A | 11/1997 | Lozman | 395/237 |
| 5,704,045 A | 12/1997 | King et al. | |

(Continued)

OTHER PUBLICATIONS

Best, Michael J., Grauer, Robert R. (1990). The Efficient Set Mathematics When Mean-Variance Problems Are Subject to General Linear Constraints. Journal of Economics and Business, 42(2), 105. Retrieved Jun. 12, 2008, from ABI/INFORM Global database.*

(Continued)

*Primary Examiner*—Hani M. Kazimi
*Assistant Examiner*—Abhishek Vyas
(74) *Attorney, Agent, or Firm*—Frost Brown Todd LLC

(57) ABSTRACT

The invention provides a method and device for creating a holistic representation of a portfolio. The model graphs diversification and explains diversification as symmetry. The model can facilitate active management of a portfolio, communication of complicated investment concepts and lucid, holistic portfolio representation. The model, normally depicted in three dimensions may provide a platform to perform portfolio analysis and manage investments. The invention embodies custom efficient portfolio creation, and diversification quantification via the intra-portfolio correlation. Portfolio creation gives the user freedom to select user-defined variables that are modeled as axes. Assets are graphed on the basis of their relationship or correlation with all the other assets in the determined asset universe. More attractive assets are graphed furthest from the origin. Thus the efficient allocation is determined using volume attribution for the assets comprising the surface of the model. Users seek to create large, symmetrical volumes that exhibit maximum diversification.

20 Claims, 32 Drawing Sheets

U.S. PATENT DOCUMENTS

| | | | | |
|---|---|---|---|---|
| 5,710,889 | A | 1/1998 | Clark et al. | 395/244 |
| 5,729,700 | A | 3/1998 | Malnikoff | 395/236 |
| 5,761,442 | A | 6/1998 | Barr et al. | 395/236 |
| 5,774,881 | A | 6/1998 | Friend et al. | 705/36 |
| 5,784,696 | A | 7/1998 | Melnikoff | |
| 5,794,224 | A | 8/1998 | Yufik | 706/14 |
| 5,799,297 | A | 8/1998 | Goodridge et al. | 707/1 |
| 5,806,048 | A | 9/1998 | Kiron et al. | 705/36 |
| 5,806,049 | A | 9/1998 | Petruzzi | 705/36 |
| 5,812,987 | A * | 9/1998 | Luskin et al. | 705/36 R |
| 5,819,238 | A | 10/1998 | Fernholz | 705/36 |
| 5,848,425 | A | 12/1998 | Lawry et al. | |
| 5,852,811 | A | 12/1998 | Atkins | 705/36 |
| 5,864,828 | A | 1/1999 | Atkins | 705/36 |
| 5,884,276 | A | 3/1999 | Zhu et al. | 705/8 |
| 5,884,285 | A | 3/1999 | Atkins | 705/36 |
| 5,884,287 | A | 3/1999 | Edeses | |
| 5,918,217 | A * | 6/1999 | Maggioncalda et al. | 705/36 R |
| 5,930,774 | A | 7/1999 | Chennault | |
| 5,946,666 | A | 8/1999 | Nevo et al. | |
| 5,991,743 | A | 11/1999 | Irving et al. | |
| 5,991,793 | A | 11/1999 | Mukaida et al. | 709/104 |
| 5,999,918 | A * | 12/1999 | Williams et al. | 705/36 R |
| 6,003,018 | A | 12/1999 | Michaud et al. | 705/36 |
| 6,012,044 | A | 1/2000 | Maggioncalda et al. | |
| 6,018,722 | A | 1/2000 | Ray et al. | |
| 6,021,397 | A | 2/2000 | Jones et al. | |
| 6,029,148 | A | 2/2000 | Zurstrassen | |
| 6,032,123 | A | 2/2000 | Jameson | |
| 6,055,517 | A | 4/2000 | Friend et al. | 705/36 |
| 6,058,377 | A | 5/2000 | Traub et al. | 705/36 |
| 6,078,903 | A | 6/2000 | Kealhofer | 705/36 |
| 6,078,904 | A | 6/2000 | Rebane | |
| 6,078,905 | A | 6/2000 | Pich-LeWinter | 705/36 |
| 6,085,174 | A | 7/2000 | Edelman | 705/36 |
| 6,085,175 | A | 7/2000 | Gugel et al. | 705/36 |
| 6,085,216 | A | 7/2000 | Huberman et al. | |
| 6,115,038 | A | 9/2000 | Christofferson et al. | |
| 6,125,355 | A | 9/2000 | Bekaert et al. | 705/36 |
| 6,173,276 | B1 | 1/2001 | Kant et al. | 705/50 |
| 6,188,992 | B1 | 2/2001 | French | |
| 6,219,649 | B1 | 4/2001 | Jameson | |
| 6,240,399 | B1 | 5/2001 | Frank et al. | 705/36 |
| 6,275,814 | B1 | 8/2001 | Giansante et al. | 705/36 |
| 6,278,983 | B1 | 8/2001 | Ball | 705/39 |
| 6,282,520 | B1 * | 8/2001 | Schirripa | 705/36 R |
| 6,292,784 | B1 | 9/2001 | Martin et al. | |
| 6,301,579 | B1 | 10/2001 | Becker | |
| 6,360,263 | B1 | 3/2002 | Kurtzberg et al. | 709/226 |
| 6,374,227 | B1 | 4/2002 | Ye | 705/8 |
| 6,405,179 | B1 | 6/2002 | Rebane | 705/36 |
| 6,601,044 | B1 * | 7/2003 | Wallman | 705/36 R |
| 7,062,458 | B2 * | 6/2006 | Maggioncalda et al. | 705/36 R |
| 2002/0091605 | A1 * | 7/2002 | Labe et al. | 705/36 |
| 2003/0088489 | A1 * | 5/2003 | Peters et al. | 705/36 |

OTHER PUBLICATIONS

Spence, James G. (1984). CML to SML: A Graphical Approach. The Financial Review, 19(4), 388. Retrieved Jun. 12, 2008, from ABI/INFORM Global database.*

Make portfolio management four-dimensional. (Cover Story) Jul. 1992, Gale Group Computer DB(TM) May 27, 1983-2008 The Gale Group.*

* cited by examiner

CONFIDENTIAL

Correlation Matrix

|            | S & P 500 | RUSSELL 2000 | US DOLLAR | YEN    | CRUDE  | UNLEADED | T-BOND | EURODOLLAR |
|------------|-----------|--------------|-----------|--------|--------|----------|--------|------------|
| S & P 500  | 1         |              |           |        |        |          |        |            |
| RUSSELL 2000 | 0.379   | 1            |           |        |        |          |        |            |
| US DOLLAR  | -0.426    | -0.539       | 1         |        |        |          |        |            |
| YEN        | 0.446     | 0.392        | -0.792    | 1      |        |          |        |            |
| CRUDE      | -0.335    | -0.41        | 0.904     | -0.76  | 1      |          |        |            |
| UNLEADED   | -0.311    | -0.4         | 0.897     | -0.73  | 0.991  | 1        |        |            |
| T-BOND     | -0.085    | -0.323       | 0.721     | -0.64  | 0.78   | 0.775    | 1      |            |
| EURODOLLAR | -0.253    | -0.176       | 0.526     | -0.45  | 0.649  | 0.607    | 0.643  | 1          |

Figure 3

| Distance | 2 | 1.75 | 1.5 | 1.25 | 1 | .75 | .5 | .25 | 0 |
|---|---|---|---|---|---|---|---|---|---|
| Correlation | -1 | -.75 | -.5 | -.25 | 0 | .25 | .5 | .75 | 1 |

Figure 25

METHOD AND APPARATUS FOR CREATING AND MANAGING A VISUAL REPRESENTATION OF A PORTFOLIO AND DETERMINING AN EFFICIENT ALLOCATION

This non-provisional patent application claims priority from U.S. provisional application No. 60/312,711 which was filed on Aug. 16, 2001. This non-provisional patent application further incorporates by reference the entirety of U.S. provisional application No. 60/312,711 which was filed on Aug. 16, 2001.

FIELD OF INVENTION

The present invention relates generally to the fields of resource allocation and data visualization. Specifically, the invention provides a platform for financial analysis through statistical representation and manipulation. It may provide a user with a method to generate a graphical representation of a portfolio's diversification and attributes. The invention may also be used to create a custom efficient asset allocation.

BACKGROUND

When seeking to visually represent investment statistics, the financial community often uses a portfolio modeling utility described in a 1952 academic paper by Nobel Laureate Harry Markowitz. Referring to FIG. 1, Markowitz's paper describes how to create a two-dimensional graph of an investment portfolio by plotting the risk associated with an asset against the return the asset generates. Referring to FIG. 2, a curve called the efficient frontier is superimposed upon the graph. This curve represents all possible portfolios of assets that comprise an efficient portfolio for various levels of risk and return. An asset is any resource, quality or feature whether tangible or non-tangible, economic or non-economic. Portfolios are collections of assets. Each unique portfolio is represented as a dot on the graph.

According to Markowitz's model, an efficient portfolio is one where for any given return, no other portfolio has less risk, and for a given level of risk, no other portfolio provides superior returns. This is more specifically defined as a mean-variance efficient portfolio. Other forms of portfolio efficiency occur when one function is maximized and or another function is minimized. Maximization and minimization are processes for discovering a value that serves the objective of the function. For example, given the integers (0, 1, 2, 3, 4, and 5) a minimization function would simply return 0. Another form of portfolio efficiency may be mode—probability of loss efficient. This would indicate that the returns of a portfolio that are observed most frequently (mode) are denominated by a value indicating the probability that the investor would lose on that investment in whole or in part. The maximum value of this ratio provides an efficient portfolio. A portfolio should only be considered efficient if its maximum or minimization functions serve to match the objectives of the investor.

Markowitz's theory generates a simple graph of the tradeoff between risk and return. The backbone of the model is mean-variance optimization (MVO), which minimizes the variance of a portfolio for a given level of returns. Variance is a measure of dispersion equal to the sum of each possible return's distance from the average expected return, weighted by that return's probability of occurring. Variance measures the variation in the value of that portfolio. The formula for portfolio variance is as follows:

$$\sigma^2(r_p) = \sum_{i=1}^{n}\sum_{j=1}^{m} w_1 w_j \sigma_{ij}$$

where $w_i$ and $w_j$ are the portfolio weights of assets i and j, respectively, and $\sigma_{ij}$ is the covariance between them.

The other part of the optimization is computationally simple. The expected return $E(r_p)$ of a portfolio is easily given by the weighted mean of the expected return of individual stocks.

$$E(r_p) = \sum_{i=1}^{n} w_i E(r_i)$$

n=the number of stocks in the portfolio,
$r_i$=the return of asset i, and
$w_i$=the portfolio weight of asset i,
such that. $\Sigma w_i = 1$ MVO is also central in determining the asset allocation. The optimization procedure searches for the allocation weights that create the portfolio with the best return to risk ratios. Thus, the efficient frontier implicitly calculates correlation by using the portfolio's internal co-variances to reduce aggregate portfolio variance. According to MVO advocates, reducing variance reduces a portfolio's risk. This is the benefit of diversification. Diversification, a portfolio characteristic commonly associated with risk, is placed under the umbrella of the portfolio variance. The outcome of the MVO process is the most variance-efficient portfolio for the aforementioned given level of return.

The efficient frontier is a collection of portfolios representing the most efficient risk to return ratios, all having been created through MVO. The graphic depiction is a two-dimensional curve. Each portfolio, individually representing different—but equally efficient—risk-return combinations is plotted on the curve. Financial professionals like to use this graphic depiction to guide investors' expectations of potential returns and to estimate the risk necessary to achieve those returns. Most professionally created financial plans today show where an investor's portfolio lies relative to the efficient frontier.

Though revolutionary in its time and helpful for important purposes, Markowitz's theory is ineffective for thorough investment analysis. The model assumes variance should be the standard measure for risk, and while some professional money managers hold that this is true, for many investors variance is not the best measurement.

Although the Markowitz model constitutes the majority of portfolio optimization, it is one of many. Diversified portfolios can be constructed without requiring the consideration of standard deviation or variance.

Other forms of portfolio optimization and resource allocation are available. The differences in these optimization techniques may include the mathematical procedure for solving the optimization problem. Markowitz is normally a quadratic optimization; however other techniques may be used including genetic algorithms, stochastic optimization, meta-heuristics, linear programming and non-linear optimization. Despite the numerous variations, only the Markowitz model is commonly associated with graphical representation.

Other techniques also vary in scope and objective. Portfolios may be optimized on nearly any basis. Portfolio optimization functions deviate from just risk and return. One of the more popular alternatives is an asset—liabilities optimization for pension funds. The pension fund may seek to minimize the net present value of future fund contributions and impose liability constraints of/on the expected future fund withdrawals. This allows the fund manger to ensure that the future liabilities of the fund are met, and only the absolute necessary funding is directed from the operations of the business. Similarly, many optimizations seek to determine a maximum utility of wealth. At the personal level, a wealth utility may mean that an investor really values retiring in ten years with 400,000 dollars in the bank. The investor surely prefers $700,000, but the marginal utility of the extra wealth is not worth the extra time and risk necessary to achieve it. The investor has defined the point of maximum wealth utility. The models create an asset allocation model and require many of the same inputs of the securities such as expected returns, measures of risk and the co-variances. This is a broad overview of popular optimization in portfolio management, more specific and intricate optimization is applied to many portfolios for a variety of economic reasons.

An optimization problem is defined by a set of variables and parameters. These variables and parameters combine to form constraints and objectives. The constraints define a feasible search space. The objectives determine the desirability of each point in the space defined by the constraints, compared to all the other points in that space. Optimization techniques use geometric information defined by the objective and the constraints in order to find the most desirable points in the search space. Optimization problems have a complex taxonomy, but in general terms, they can be divided into linear or nonlinear, convex or non-convex, continuous or discrete (combinatorial) and deterministic or stochastic. Depending on the classification, according to all the categories above, different solution techniques can be applied for solving a specific problem.

Correlation is the measure of the statistical relationship between any two events, observations or occurrences. When a positive incremental change in one asset statistic is always related to an equivalent positive incremental change in the other, those statistics have a perfect positive correlation, or a correlation value of 1. On the other hand, when two asset statistics have a perfect negative correlation (a correlation value of −1), a positive incremental change in one is always related to an equivalent negative incremental change in the other. Correlation values between 1 and −1 represent the spectrum of statistical correlation possible. A correlation value of zero indicates that there is no statistical relationship between the compared asset statistics. These correlation values may also be scaled for different ranges.

The notation is included below to calculate the Pearson correlation coefficient:

We use the symbol r to stand for the correlation.

$$r = \frac{\sum_{i=1}^{n}(x_i - \bar{x})(y_i - \bar{y})}{\sqrt{\left(\sum_{i=1}^{n}(x_i - \bar{x})^2\right)\left(\sum_{i=1}^{n}(y_i - \bar{y})^2\right)}}$$

$y_i$=An individual observation of the y variable.
$x_i$=An individual observation of the x variable.
$\bar{x}$=An average of the x variables.
$\bar{y}$=An average of the y variables.
n=The number of observations.

Correlation is the mathematics behind diversification. Industry regulators agree that basing investment decisions on historical returns is perilous. The SEC recognizes this logic as unsound. Figures and statements referencing historical returns often need be accompanied with such disclaimers as, "Past performance is not indicative of future returns."

Diversification helps investment managers fulfill their fiduciary responsibility to their customers. The law has evolved to subject their rationale to the "prudent investor rule."Investment managers have fulfilled their legal duties, as fiduciaries, if their investment decisions—win or lose—would be decisions made by a prudent man. In 1976, the U.S. Department of Labor, the government body responsible for Employee Retirement Income Security Act (ERISA), determined that questions of prudence regarding mutual fund investing would be decided on the merits of diversification, not on the basis of individual stock selection. This mode of thinking seems to be in favor with market regulators, yet practitioners have difficulty following the play list.

Despite the merits of diversification, the dreary simplicity of past performance as an asset selection method makes it a dominant method despite the best efforts of government regulators to curtail its use. Correlation is a more effective asset-management tool. Many common practices of investment selection rely on historical returns. Extrapolating historical returns to predict future returns is a poor if not damaging proxy. Inexperienced investors are especially vulnerable to the luster of historical returns. An investor is susceptible to being carried away with a prospective investment merely because it had a superior historical performance. Forcing an investment decision to comply with the portfolio objectives helps prevent chasing yesterday's best performing assets.

Correlations are more predictable than prices. Asset prices are inclined to mean revert. Markets usually over-swing in both directions. This is in the nature of a boom-bust cycle. If one chooses to use historical correlations as a primary model determinant, the model will have more predictive power that any equivalent model that uses historical returns as a primary determinant.

Predicting returns will always be challenging, so diversification will never cease to be a key consideration. If investors are correct in their assessments of future returns, risk is benign. However, when assessments are incorrect the likelihood of loss is greater. It is at these times of inaccurate assessments that a manager's need for risk management is greatest.

An investor who understands that two assets have performed in a given fashion may undertake a position based on the assets' relationship. (See FIGS. 3-11).

Referring to FIG. 3, there is illustrated a correlation matrix. The correlation matrix consists of eight popular futures contracts observed during the year 2000.

Referring to FIG. 4, the S & P 500 and Russell 2000 moved in opposite directions until mid-March, causing a low historical correlation of 0.379. Normally equities of the same country would be expected to have a correlation closer to 0.75. The correlation will vary depending on the time span and observation frequency.

Referring to FIG. 5, this figure shows the time series graph for the Russell 2000 stock index futures. None of the relationships of the Russell with the other futures contracts listed were strong during this period. Strong correlations may be strong positive or strong negative as the correlation approaches 1 or negative 1.

Referring to FIG. 6, this figure shows the time series graph for the U.S. Dollar Index futures contract. The dollar had strong correlations to most other assets indicating that foreign capital flows during the time period were net positive for the United States.

Referring to FIG. 7, this figure shows the time series graph for the Japanese yen futures contract. The yen has a natural negative correlational component to the dollar in that investors wishing to buy dollars may need to sell yen and in order to buy yen investments held in dollars would have to be sold.

Referring to FIG. 8, this figure shows the time series graph for the Eurodollar futures. The Eurodollar and Treasury bond are both interest rate products but are at opposite ends of the yield curve, over time, their prices act similarly providing a definite positive correlation. On a daily basis the relationship is much more moderate. Differences in magnitude, not so much in the direction provide the differences. The correlation of 0.643 confirms this relationship.

Referring to FIG. 9, this figure shows the time series graph for the 30 year Treasury bond futures. The Treasury bond is strongly linked to the dollar, crude and unleaded. This relationship is in part explained in the fact that foreign investors who choose to purchase Treasury bonds must also buy dollars. This helps to explain the positive correlation of 0.721.

Referring to FIG. 10, this figure shows the time series graph for the Crude oil futures. Crude has a correlation with the dollar of 0.897. This strong positive correlation could be used by an investor to better understand the relationships of these important assets.

Referring to FIG. 11, this figure shows the time series graph for unleaded gasoline futures. Unleaded Gasoline is refined from crude oil; their prices are tightly coupled and rarely deviate. This tight relationship is maintained by arbitrageurs who attempt to profit from relative price differences.

To gain a better understanding of correlation, compare the correlation between any of the two assets to the graphs of those assets taken over the same time period. If that investor believes that the relationship of the securities will break from its given pattern, and they believe that they can predict one or more of the respective directions of the pair, the likelihood of a loss is smaller than the likelihood of a loss that would be normally associated with a similar position taken in two assets with an unknown relationship. To incur a loss on the trade the investor must be correct about the decoupling of the assets relationship but be wrong about the magnitudes and/or directions of the individual moves. Alternatively, the investor would substantially break even if the relationship does not decouple. In short, the investor's risk is reduced by correctly forecasting an additional element of analysis; the assets relationship or correlation. Investors who repeat this process for other assets with no relationships or an insignificant relationship to the first pair are able to deliberately build significantly diversified portfolios. Investors may use the correlations of assets' relationships to further isolate and determine the risks that they wish to take or avoid.

The world is filled with different risks. A more desirable model can permit greater breadth of measures, definitions and classifications. MVO has limitations as to how risk can be defined. Nonetheless, MVO has evolved to accommodate semi-variance. Semi-variance is probably a better measure of true risk. Where as variance measures the change associated with the prices of a security, semi-variance measures the variability of price only when the price has a negative movement. This prevents positive price movements from adding to the risk level. While semi-variance moves in the right direction to accurately account for risk, risk contains elements that do not readily lend themselves to one simple quantification. Practitioners may prefer to use multiple measures or a custom measure of risk designed to match their own needs.

Entities, engaged in investments and risk management, are exposed to many different categories of risk. These include:

investment risk: the risk necessary to take or hold a position in the markets.

market risk: the risk given by the broad market or general economic conditions.

credit risk: a measure of the borrower's financial ability to repay debt.

business risk: the risk associated with the management of a particular company in a particular industry and that company's uncertainty of their future earnings.

currency risk: the potential for an investment to be impacted by a change in the exchange rate of any two countries including a direct impact when an investment is denominated in a depreciated foreign currency or indirect when an investment in another asset (i.e. an export business) is damaged when the earnings of that concern fall because of an appreciation of the home currency.

political risk: the potential that changes in legislation or party politics may disrupt the investment expectations or increase the uncertainty of the future.

country risk: risk that changes in the social, economic or political landscape of any one country will affect an investment directly or indirectly.

interest rate risk: measures the sensitivity of an asset to changes in interest rates.

liquidity risk: the risk that buyers or sellers will not be present at the time you wish to trade. Thus, buyers only find sellers at higher prices and sellers only find buyers at lower prices.

counter-party risk: the risk that the counter party to any trade will go bankrupt, refuse to indemnify or not recognize the trade as legitimate.

Some of these risks can be diversified away by spreading out capital to a broad spectrum of similarly denominated securities. For example, to reduce country risk, one normally seeks to invest capital among many countries with varying geopolitical attributes. Other times these risks can be directly "hedged." For example, if a portfolio manager expects a particular company's stock to outperform the market, yet is not willing to bear the risk of being in the market, the manager may purchase that stock and sell an equal amount in a market-index contract (such as the S & P 500). In both scenarios, the manager is attempting to achieve a balance.

Visual representation of an asset allocation is largely the domain of the pie chart or a price chart. A pie chart shows the portfolio weights while a price chart shows the performance. A pie chart contains very little information and provides no information as to the internal dynamics of a portfolio. Correlations can be individually graphed in a manner showing a time sequential graphs of one or two assets and a correlation or a regression. (FIGS. 10,11) But a greater visualization platform would foster better understanding and empower individual and professional investors to make better decisions.

In order to better capitalize on diversification, the investor would prefer to be able to visualize and manipulate the individual assets in the portfolio—a benefit they do not receive from the efficient frontier, any asset allocation model or any present form of portfolio optimization. The time has come to broaden our conception of risk, refine our notions of diversification, and reveal portfolio composition in a lucid graphical form.

SUMMARY OF THE INVENTION

There is a need in the art for a method of creating a holistic representation of an investment portfolio that can facilitate active management of that portfolio. There is also a need for a method of simply communicating complicated investment concepts, such as correlation, diversification, risk-adjusted return or other statistical, technical or fundamental qualities. There is a need for lucid, holistic portfolio representation. The invention provides a platform to perform portfolio analysis and manage investments. At least two purposes are served by the invention. The first is efficient portfolio creation, employing user-defined variables to select assets and correlation to model them in order to maximize diversification. The second is lucid portfolio representation, in which the user can appreciate the portfolio as a whole while also viewing the individual components.

Thus, one embodiment of the invention comprises a graphical simulator comprising a computerized processor wherein said computerized processor is configured to accept an asset universe wherein said asset universe comprises at least two assets; construct a relationship matrix for said asset universe wherein said relationship matrix depicts a quantification of a relationship between each of said at least two assets from said asset universe relative to each of said other assets from said asset universe; determine a vector or coordinate for each of said at least two assets based on said relationship matrix; rescale each said vector or coordinate to match said vector or coordinate to a set of selected variables; plot each of said rescaled vectors or coordinates to create a model of said asset universe; and construct a hull for said model.

Another embodiment of the invention comprises a graphical simulator comprising a computerized processor wherein said computerized processor is configured to accept an asset universe wherein said asset universe comprises at least two assets; construct a relationship matrix for said asset universe wherein said relationship matrix depicts a correlation computed from a correlation formula wherein said correlation formula measures the performance of each of said at least two assets from said asset universe relative to each of said other assets from said asset universe; and compute a vector component for each of said at least two assets in said asset universe for depiction in a base model wherein said vector component represents a relationship derived from said relationship matrix for each of said at least two assets in relation to each other;

Another embodiment of the invention comprises a graphical simulator wherein said base model comprises a set of axes wherein said axes represent attributes associated with a set of objectives for said asset universe.

Another embodiment of the invention comprises a graphical simulator wherein said computerized processor calculates said vector components for said asset universe so that a set of assets in said asset universe with a positive correlation value appear closer to each other in said base model; and a set of assets in said asset universe with a negative correlation value appear in opposition to each other in said base model.

Another embodiment of the invention comprises a graphical simulator wherein said vector component may be scaled according to a set of predetermined criteria.

Another embodiment of the invention comprises a graphical simulator wherein said computer processor generates a surface comprising a set of data points representing a set of assets appearing on said base model's exterior.

Another embodiment of the invention comprises a graphical simulator wherein said graphical simulator further comprises a computerized display device in communication with said computer processor and wherein said computer processor creates a second model associated with a second asset universe and communicates said second model to said computerized display device to be simultaneously displayed on said computerized display device with said base model.

Another embodiment of the invention comprises a graphical simulator wherein said second asset universe comprises an historical asset universe.

Another embodiment of the invention comprises a graphical simulator wherein said graphical simulator further comprises a computerized display device in communication with said computer processor and wherein said computer processor creates a second model associated with a second asset universe and communicates said second model to said computerized display device to be successively displayed on said computerized display device.

Another embodiment of the invention comprises a graphical simulator wherein said graphical simulator further comprises a computerized display device in communication with said computer processor and wherein said computer processor creates a second model associated with a second asset universe and communicates said second model to said computerized display device to overlay a display associated with said base model with a display of said second model.

Another embodiment of the invention comprises a graphical simulator comprising a computerized processor and a display device in communication with said computerized processor wherein said computerized processor is configured to accept an asset universe wherein said asset universe comprises at least two assets; construct a relationship matrix for said asset universe wherein said relationship matrix depicts a correlation computed from a correlation formula wherein said correlation formula measures the performance of each of said at least two assets from said asset universe relative to each of said other assets from said asset universe; compute a set of vector components between each of said at least two assets in said asset universe wherein said vector components are derived from said relationship matrix for each of said at least two assets in relation to each other; adjust said vector components to conform to a set of predefined constraints; communicate said vector components associated with each of said at least two assets to said display device to display a model of said asset universe.

Another embodiment of the invention comprises a graphical simulator wherein said processor is capable of adjusting the view of said model.

Another embodiment of the invention comprises a graphical simulator wherein said computerized processor is further configured to generate a surface comprising a set of data points representing a set of assets appearing on said model's exterior and to determine a volume associated with said model.

Another embodiment of the invention comprises a graphical simulator wherein said computerized processor is further configured to color-code said generated surface.

Another embodiment of the invention comprises a graphical simulator wherein said computerized processor is configured to permit selection of any given asset in said model and to create a model displaying a set of correlative values for a set of attributes associated with said given asset.

Another embodiment of the invention comprises a graphical simulator wherein said computerized processor is further configured to accept additional data regarding said asset universe and create an animated series of models illustrating a set of differences between a first model and a set of additional models.

Another embodiment of the invention comprises a graphical simulator wherein said model is displayed in a substantially three-dimensional space.

Another embodiment of the invention comprises a graphical simulator comprising a computerized processor and a display device in communication with said computerized processor wherein said computerized processor is configured to accept a resource universe wherein said resource universe comprises at least two resources; construct a relationship matrix for said resource universe wherein said relationship matrix depicts a correlation computed from a correlation formula wherein said correlation formula measures the correlation between each of said at least two assets from said resource universe relative to each of said other resources from said resource universe; compute a set of vector components between each of said at least two resources in said resource universe wherein said vector components are derived from said relationship matrix for each of said at least two resources in relation to each other; adjust said vector components to conform to a set of predefined constraints; communicate said vector components associated with each of said at least two resources to said display device to display a model of said resource universe.

Another embodiment of the invention comprises a method of selecting a set of assets comprising an efficient set comprising the steps of selecting an asset universe wherein said asset universe comprises at least two assets; constructing a relationship matrix for said asset universe wherein said relationship matrix depicts a relationship quantification between each of said at least two assets from said asset universe relative to each of said other assets from said asset universe; solving a system of equations to determine a vector or coordinate for each of said at least two assets based on said relationship matrix; scaling said vector or coordinate for each of said at least two assets against a set of selected variables; plotting said vector or coordinate to create a model representing said asset universe; determining an exterior for the model; determining an efficient set by selecting a set of assets wherein each asset in said set of assets comprises a set of coordinates which are located on the substantial exterior of the model.

Another embodiment of the invention comprises a method of determining an efficient allocation for a set of assets comprising the steps of selecting an asset universe wherein said asset universe comprises at least two assets; constructing a relationship matrix for said asset universe wherein said relationship matrix depicts a relationship quantification between each of said at least two assets from said asset universe relative to each of said other assets from said asset universe; determine a vector or coordinate for each of said at least two assets based on said relationship matrix; scaling each said vector or coordinate for each of said at least two assets according to a set of predefined criteria; creating a model from said vector or coordinate for each of said at least two assets; determining an exterior surface for said model; determining a set of assets associated with a set of coordinates which are substantially located on said exterior surface of said model;

re-allocating a set of resources associated with each of said at least two assets to produce said efficient allocation.

BRIEF DESCRIPTION OF THE DRAWINGS

FIG. 3 shows a correlation matrix.

FIG. 4 shows the time series graph for the S & P 500 stock index futures.

FIG. 5 shows the time series graph for the Russell 2000 stock index futures.

FIG. 6 shows the time series graph for the U.S. Dollar Index futures contract.

FIG. 7 shows the time series graph for the Japanese yen futures contract.

FIG. 8 shows the time series graph for the Eurodollar futures.

FIG. 9 shows the time series graph for the 30 year Treasury bond futures.

FIG. 10 shows the time series graph for the Crude oil futures.

FIG. 11 shows the time series graph for unleaded gasoline futures.

FIG. 25 shows an example of how correlation is normalized for a distance.

DETAILED DESCRIPTION OF THE INVENTION

The quantifiable portion of diversification may be measured by the weighted average intra-portfolio correlation. This is a statistical measurement from negative one to one that measures the degree to which the various assets in a portfolio can be expected to perform in a similar fashion.

| Intra-portfolio correlation | Percent of diversifiable risk eliminated |
| --- | --- |
| 1 | 0% |
| .75 | 12.5% |
| .50 | 25% |
| .25 | 32.5% |
| 0 | 50% |
| −.25 | 62.5% |
| −.50 | 75% |
| −.75 | 87.5% |
| −1 | 100% |

Portfolio balance occurs as the sum of all intra-portfolio correlations approaches negative one (or a scaled equivalent thereof). Diversification may be defined as the intra-portfolio correlation or, more specifically, the weighted average intra-portfolio correlation. Maximum diversification may occur when the intra-portfolio correlation is minimized. Intra-portfolio correlation may be an effective risk management measurement. The computation may be expressed as:

$$Q = \left(\sum_i \sum_j X_i X_j p_{ij} \text{ when } \ldots i \ne j\right) \bigg/ \left(\sum_i \sum_j X_i X_j \text{ when } \ldots i \ne j\right)$$

Where Q is the intra-portfolio correlation,
$X_i$ is the fraction invested in asset i,
$X_j$ is the fraction invested in asset j,
$P_{ij}$ is the correlation between assets i and j,
The expression may be computed at least when i≠j For example take a three asset portfolio, consisting of assets i, and j: The portfolio weights are Xi=0.30, Xj=0.70 and the correlations are pij=−1. Therefore, the intra-portfolio correlation is:

$$=((X_i \times X_j \times p_{ij}) + (X_j \times X_i \times p_{ji}))/(X_i \times X_j) + (X_j \times X_i)$$

$$=(0.3 \times 0.7 \times -1) + (0.7 \times 0.3 \times -1)/(0.7 \times 0.3) + (0.7 \times 0.3)$$

$$=-0.42/0.42$$

$$=-1$$

Figure 14:
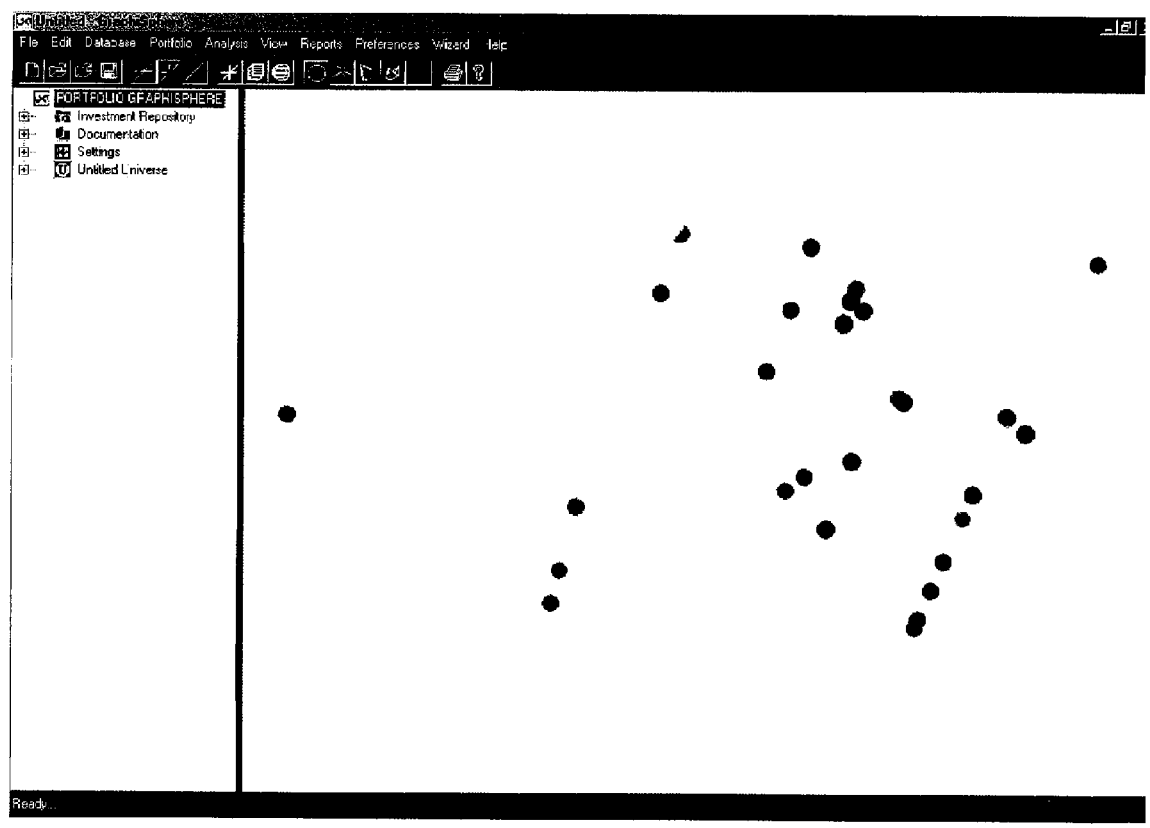
FIG. 14 shows a point cloud of assets created under the model and optimization utilized by an embodiment of the invention.
Figure 15:
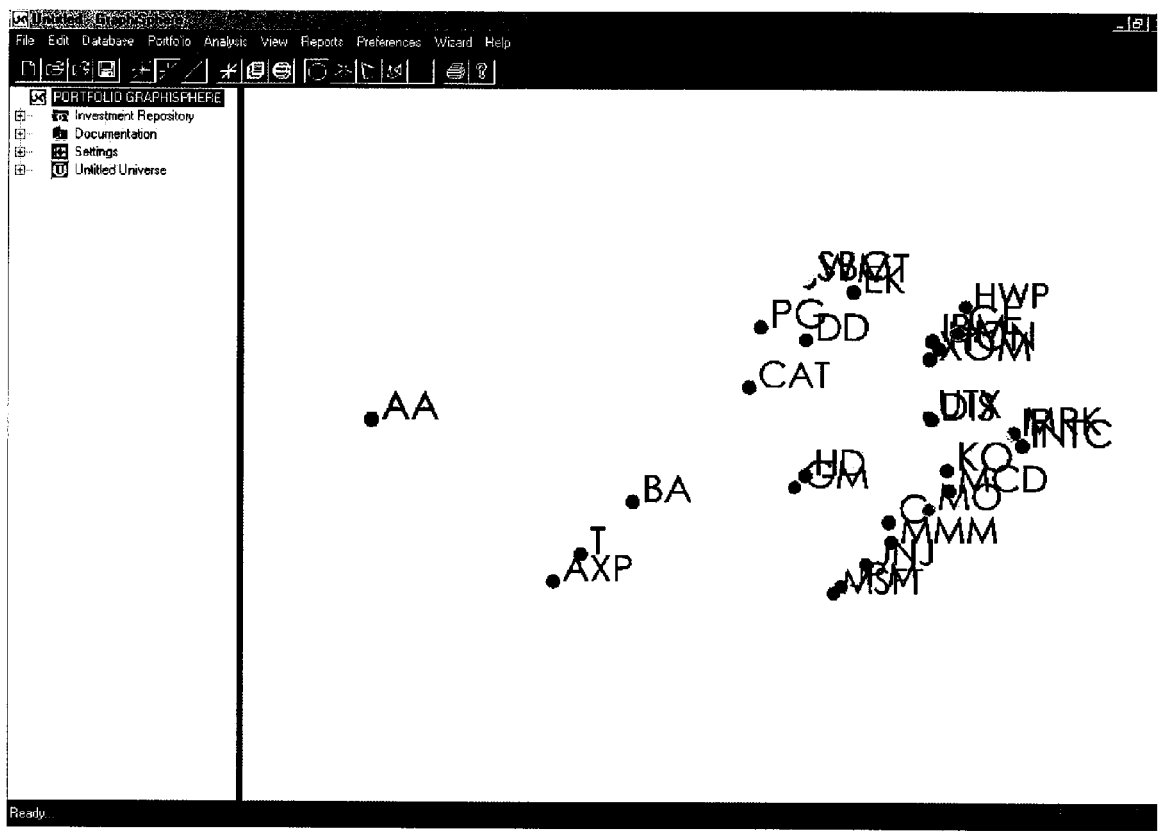
FIG. 15 shows the graphs and names of a modeled asset universe.
Figure 16:
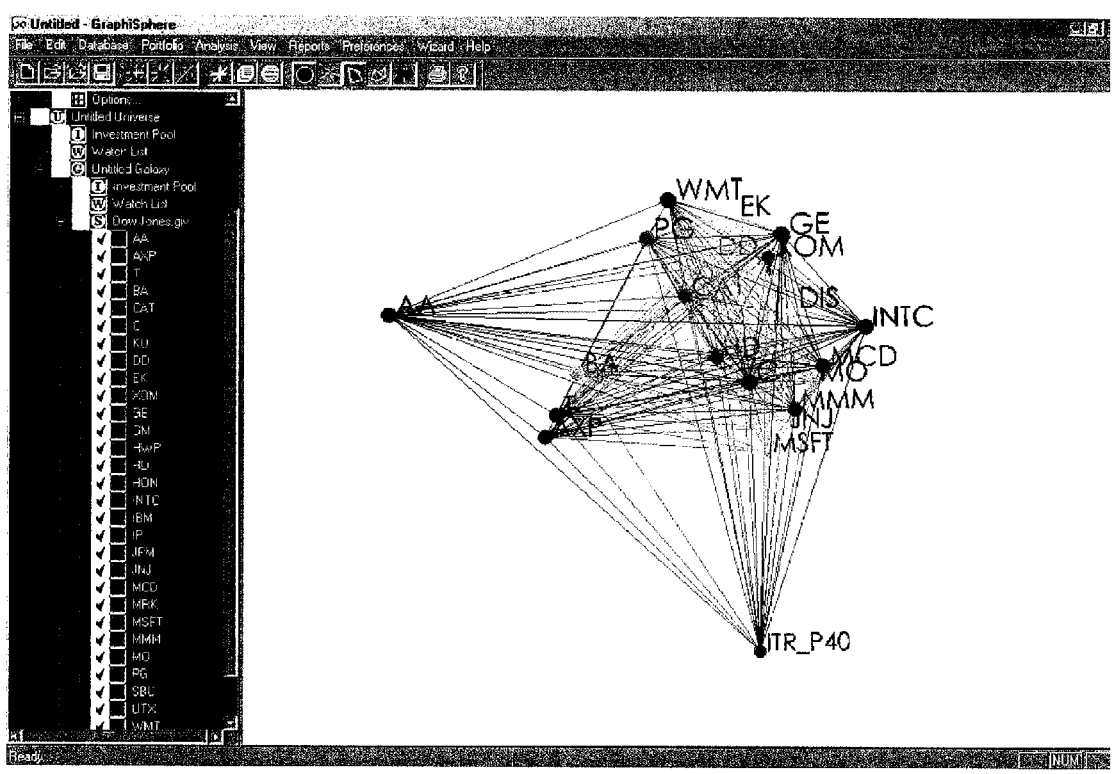
FIG. 16 shows an asset universe with the asset relationships visible.
Figure 17:
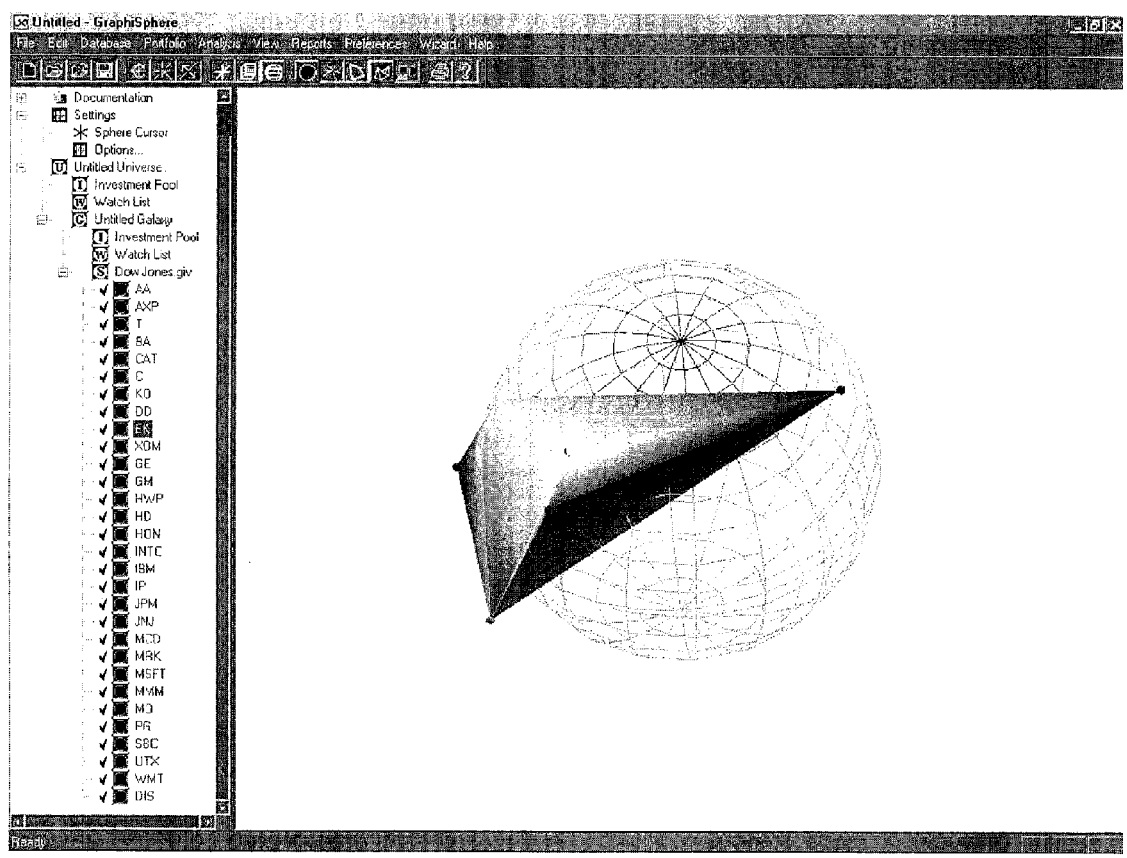
FIG. 17 shows an efficient portfolio.

Once the asset universe has been determined and the axes assigned variables, the invention individually graphs each asset being considered for a portfolio. Refer to FIGS. 14 (Plots) & 15 (Names). A program embodying the invention may graph the placement of each individual asset in a manner that displays the entire portfolio and selects the best assets. The assets may be allocated in a manner where the optimal assets are furthest from the origin. The optimal assets shape and depict the portfolio and are allocated based on their geometric properties. The connections between the assets are given by the assets' relationships with one another. Enabling this method is a process by which correlations are used as a measure of distance or angle indicative of the relationship between the assets. Referring to FIG. 16 (Correlation Lines), this figure shows an asset universe with the asset relationships visible. The wire frame model shown here begins to give the model shape, and this visualization permits interior viewing so that every asset, whether efficient or inefficient is visible. The graph displays the entire correlation structure of the asset universe. Referring to FIG. 17 (Diversification Explanation), this figure shows the result is a visual explanation of diversification. The symmetry of the portfolio may be contrasted to that of a perfectly symmetrical object; a sphere. The contrast of the two shapes provides an explanation of diversification, given that perfect symmetry or balance is equivalent to perfect diversification.

Figure 18:
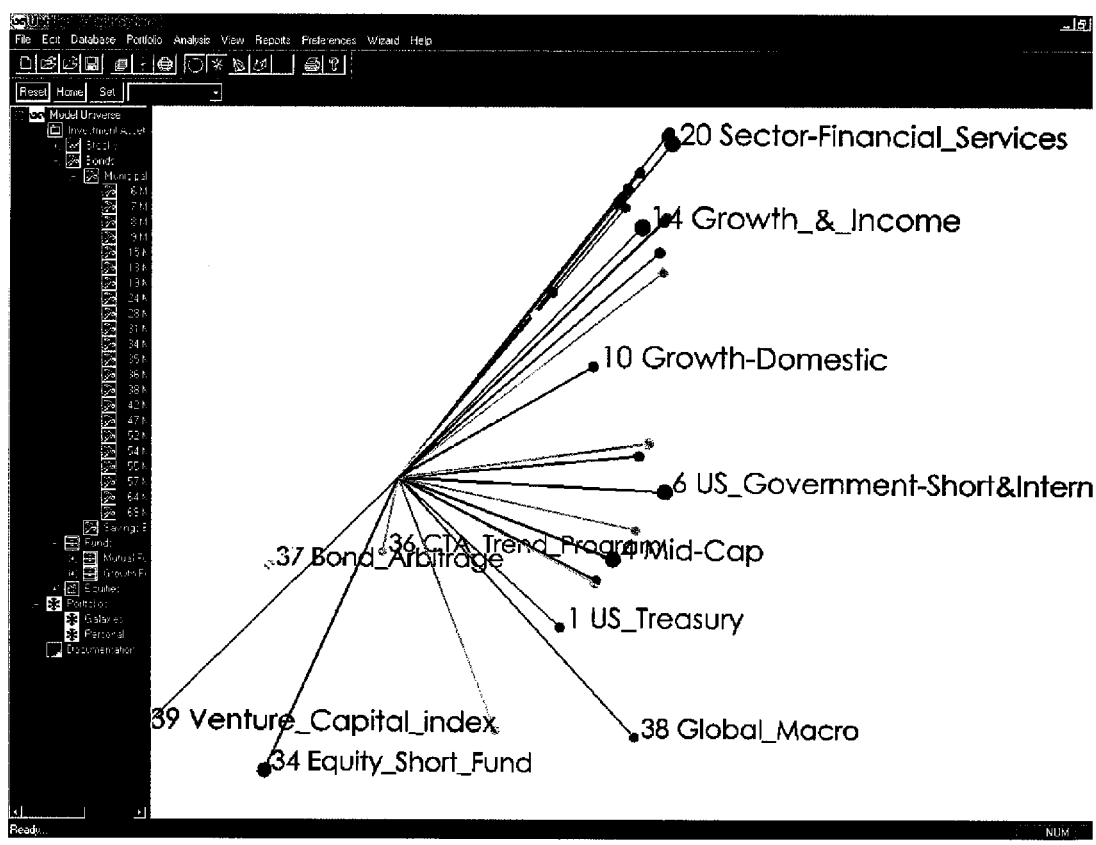
FIG. 18 shows the vectors created with an embodiment of the invention.
Figure 19:
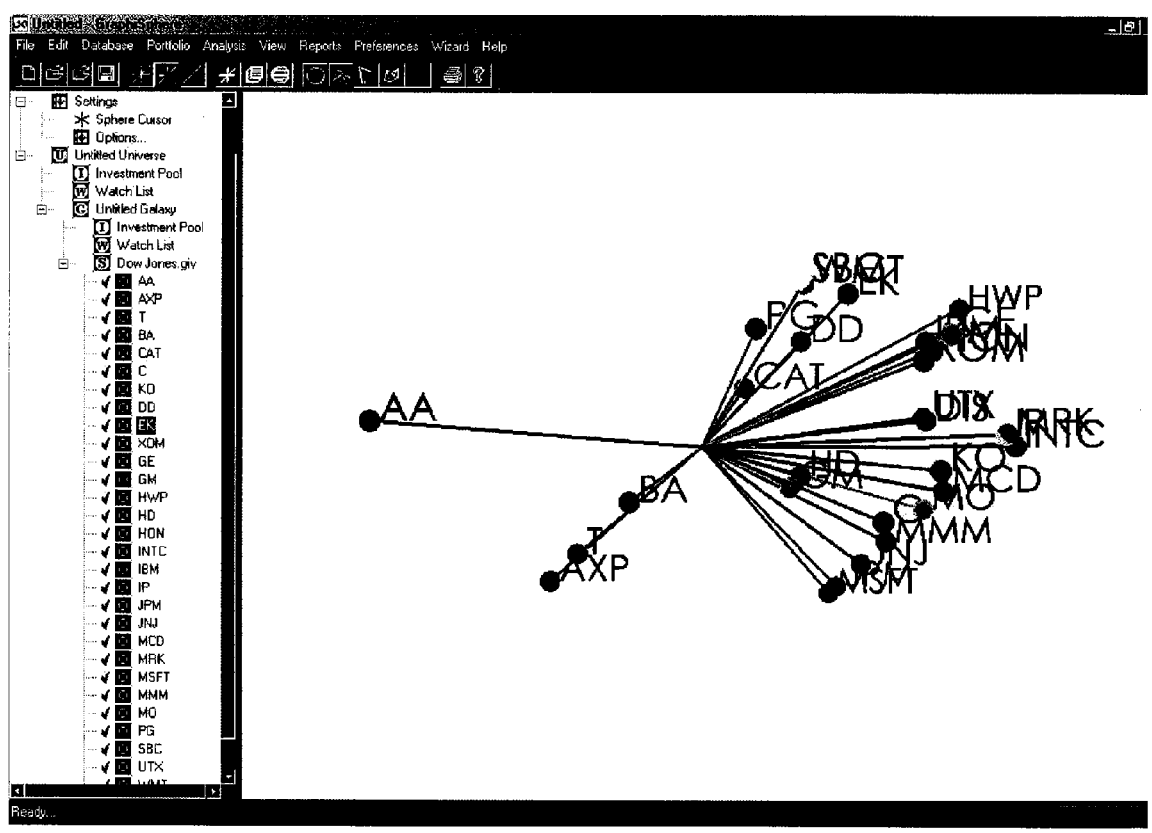
FIG. 19 shows another universe depicted by vectors.

The portfolio, once created, may be displayed to the investor holistically, while simultaneously showing the components. The attributes of the individual components may be illustrated in tandem with their relationships to each other. Assets with strong correlations may appear physically closer to each other in the model than those assets with less positive or negative correlations. Assets with perfect negative correlations may be ideally plotted diametrically opposite to each other. Referring to FIGS. 18 and 19 (Vectors 1 & 2), this figure shows the vectors created with an embodiment of the invention. The vectors' direction depicts the correlations and the distance provides for the most attractive assets to be furthest from the origin. Assets with no significant correlation may generally be graphed halfway across the model. FIG. 19 shows that assets with strong positive correlations may be graphed near each other, and negatively correlated assets may be opposite. Here AA shows a strong negative correlation to most of the rest of the asset universe. Undesirable or inefficient assets also appear in the model. They are interior to the surface of the model. It may be easily determined how close an inefficient asset may be to becoming an efficient asset. Likewise a user could easily visualize how close an efficient asset is to losing its allocation weighting. In alternative embodiments, the orientation of the assets to show particular relationships (i.e., interior, closer together, etc.) may be modified.

Figure 20:
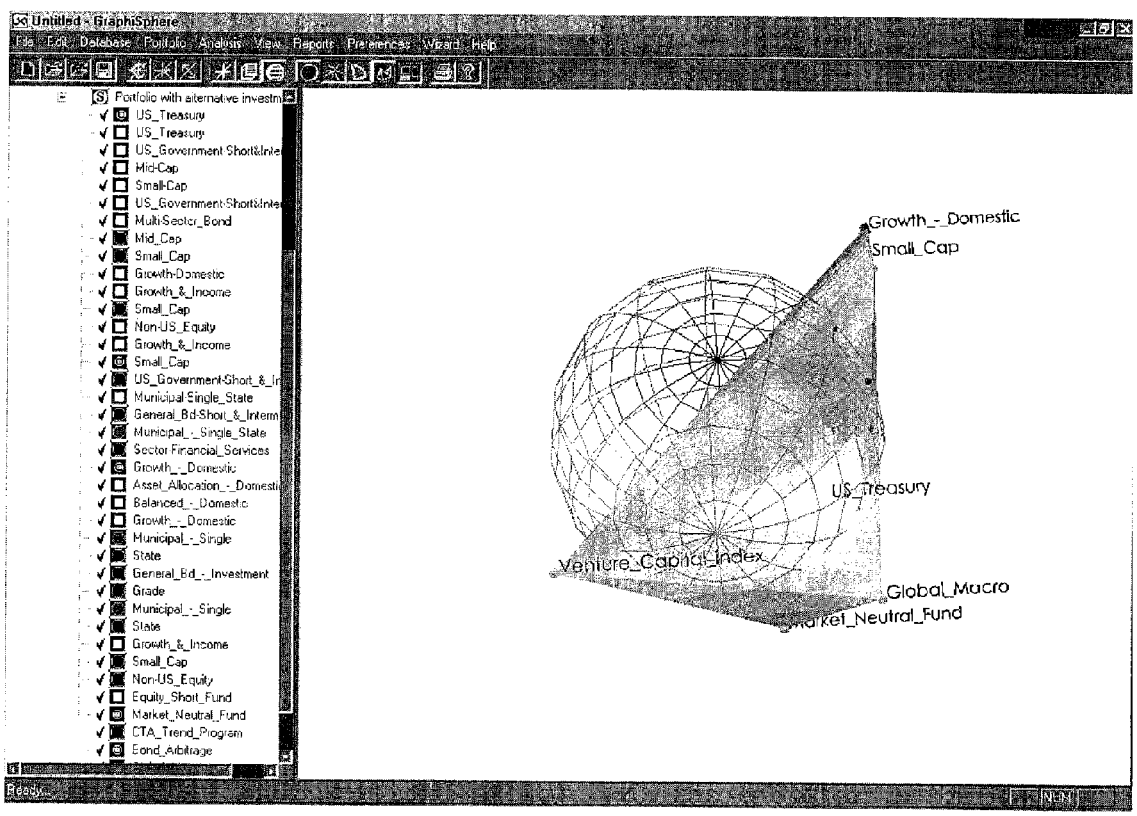
FIG. 20 depicts an efficient portfolio of assets. The assets that comprise the efficient portfolio are readily apparent and the relationships of the portfolio holdings are easy to recognize.

By presenting a whole portfolio in conjunction with portfolio components, the invention makes simple work of communicating complex investment concepts to novices. The lucidity of the model makes sophisticated investment analysis possible for all. This may be accomplished by equating analytical tools with concepts from the physical world like mass, volume, density, symmetry, and pliability. Two primary rules guide the new paradigm of investment analysis: maximize size and symmetry. Referring to FIG. 20 (Balance), the graph displays information about a portfolio's diversification that is presently only gleaned from a skilled professional after a careful review of a spreadsheet. Portfolios holding assets numbering circa twenty and more have, historically, been impossible to decipher or analyze in such manner. Using techniques which embody the invention, the art of investment analysis shifts, eliminating management redundancies and tedious calculations and enabling more creativity and intuition. By utilizing diversification as the dominant factor in portfolio construction, professional liability arising from an absence of suitability or prudence may be minimized.

Additionally, the invention allows portfolios to be easily manipulated by more sophisticated investors. This was a major shortcoming of prior models. Recall that the efficient frontier implicitly calculates correlation by aggregating the co-variances of the portfolio's assets. Changing correlation from being implicit to explicit gives the investment manager more control, fosters a better understanding of portfolio dynamics and unlocks the potential for dynamic diversification strategies and enhanced risk management. Sophisticated users can incorporate other physics-based metrics to provide richer analysis.

Figure 34:
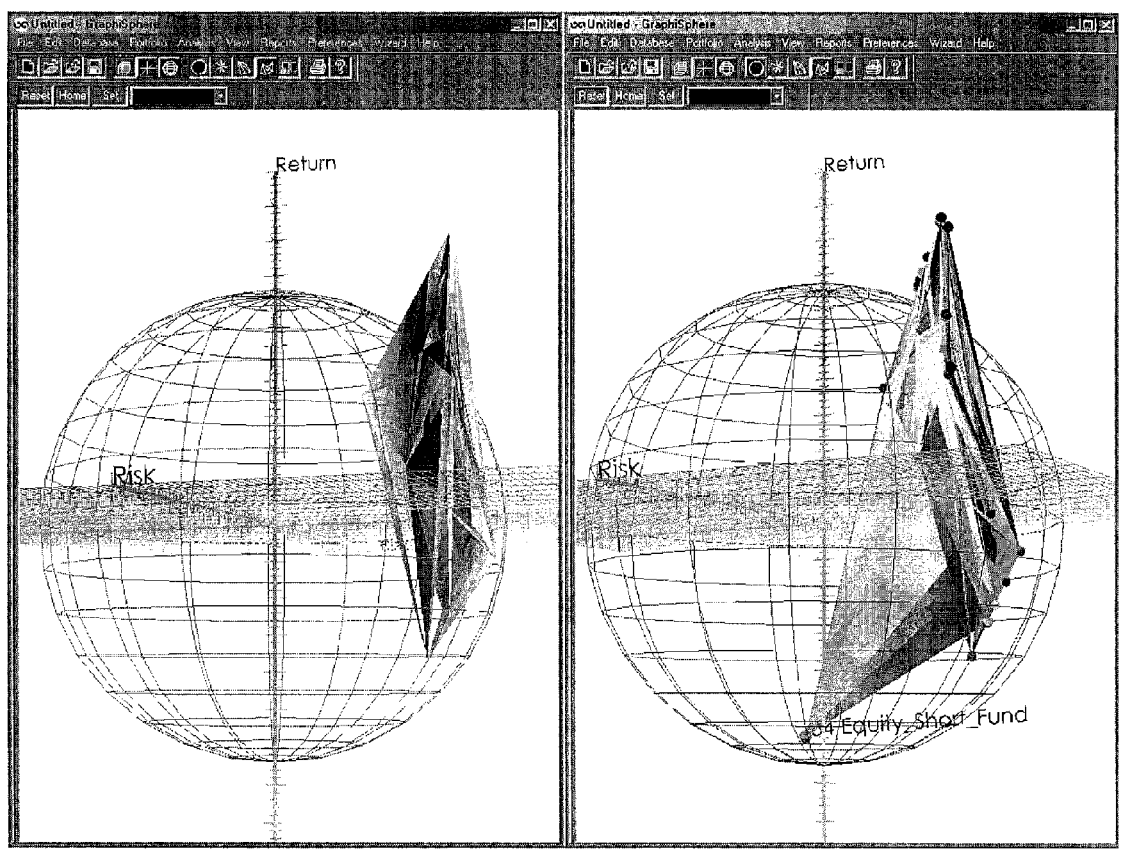
FIG. 34 shows an embodiment of the invention that separately displays two portfolios, the portfolio are easily comparable.

Concepts like correlation and risk-adjusted returns are often too complicated to be sufficiently communicated to anyone outside the investment field. This makes selling complex investments difficult despite the statistical benefits achieved from employing such strategies. Even Wall Street veterans cannot readily quantify diversification. Due to the void of concrete diversification information, mean-variance analysis is often mistaken as synonymous with diversification. Investment professionals need to be able to communicate these concepts; embodiments of the current invention facilitate communication through graphical representation and a standardized measurement for diversification. Referring to FIG. 34 (Compare), the model created by an embodiment of the invention thus creates easy comparisons.

Strategies that are challenging for investors using other models become effective and simple using the invention. Portfolio rebalancing is one example. Most asset allocation models incorporate some type of rebalancing feature. Rebalancing a portfolio reallocates resources derived from those assets that have over-produced to those that have under-produced. It is believed that this action helps to reduce the risk in the portfolio. Re-balancing is most effective when the portfolio is more diversified and assets are allocated towards high return investments. However, due to the limitations inherent in current asset allocation models, rebalancing has been only marginally effective. The correlation between high returning assets and assets that have high risk is strong (correlation equals 1). Because of this relationship, some assets with a potential to increase the returns of the portfolio are not granted a significant allocation because they may (to a greater extent) increase the variance of the portfolio. This leads to a rebalancing implemented in a typical mean-variance portfolio without the opportunity to adjust the highest performing assets to the extent possible in the present invention.

The proliferation of derivate instruments has greatly increased an investor's ability to separate and isolate risks. This allows investors to better select what risks they desire to take and what risks they wish to avoid. However, the education and sophistication necessary to implement many strategies using these techniques has increased as well. The use of this invention helps simplify the implementation of sophisticated asset allocation models.

Another novel attribute of the model is its ability to visually depict diversifiable risk from non-diversifiable risk. A model which has maximum symmetry is one in which diversifiable risks have been eliminated to the fullest extent possible; this is a balanced portfolio. In this case, the remaining risk may be inherent to market participation. Presently there is no technique to visualize the separation of diversifiable risk from market risk or other risks that are out of the reach of diversification strategies.

Embodiments of the invention may include a computerized processor wherein said computerized processor comprises hardware and/or software. Said embodiments may further be in communication with and/or coupled to a display device including a computerized display device. Other embodiments may be capable of producing a non-electronic display.

One embodiment of the invention is a method for creating a computerized visual representation of at least two assets in at least one virtual space comprising: selecting a first asset; selecting a second asset; determining a correlation, with regard to a predetermined set of criteria, between said first asset and said second asset; plotting a position for said first asset and said second asset in said at least one virtual space wherein said correlation is represented by said first asset position and said second asset position.

In another embodiment of the invention, a method for creating a computerized visual representation of assets in at least one virtual space comprises: selecting a plurality of assets; creating a matrix of correlations, with regard to a predetermined set of criteria, between said plurality of assets; plotting a position for each of said plurality of assets in at least one virtual space wherein said correlations between said plurality of assets are represented by said asset positions.

Figure 21:
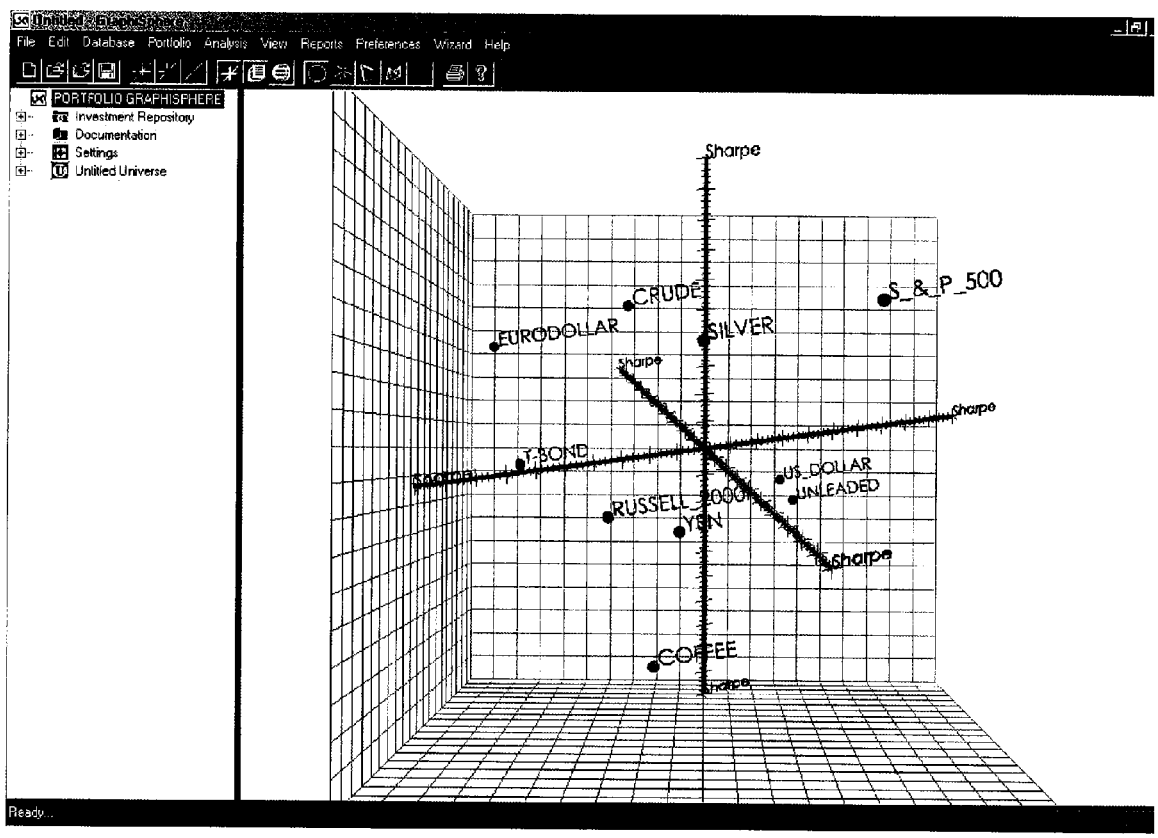
FIG. 21 shows a portfolio of futures contracts that is modeled using the Sharpe ratio as distance for each axis.
Figure 22:
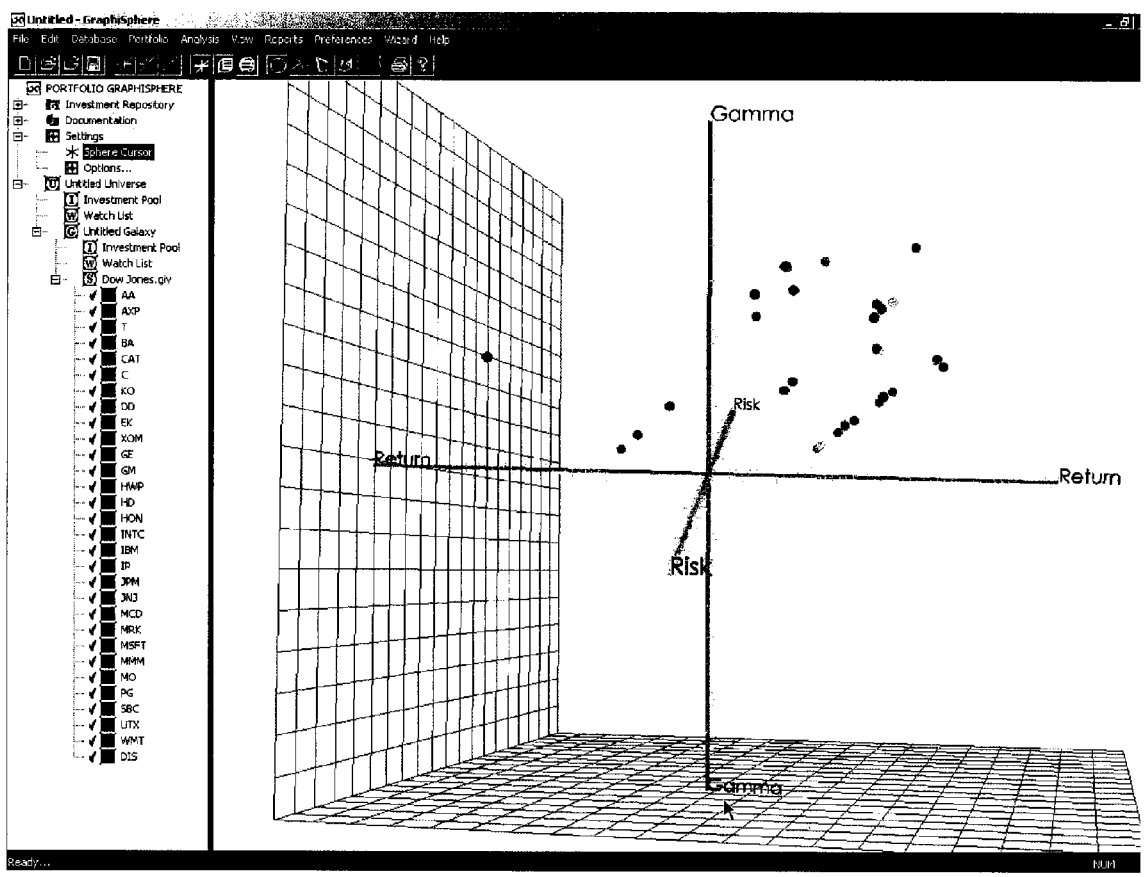
FIG. 22 shows an asset universe that has been determined by the user to model the portfolio using three axes; returns, risk and gamma.

The present invention permits investors with different portfolio objectives to create portfolios that optimize their asset allocation with respect to their specific objectives and preferences. The creator of the portfolio may first select all assets to be considered by the invention based on the investor's unique preferences. The group of the assets under consideration may be referred to as the asset universe. Then, the investor may select up to three variables to assign to the axes of the model. The selection of the axis data set can vary widely: aggressive investors can choose axes most likely to determine greater returns. These may include any factor which may influence the performance of the asset's or portfolio's expected returns, alpha (the portion of returns specifically attributable to the unique characteristics of that asset, as distinguished from the total returns which contain returns derived from other sources as the market), or ratings. Another investor would be free to assign a ranking based on the social responsibility of the assets within their universe. Similarly, a risk-adverse investor may find that variance, credit rating and dividend yield secure their investments best. See, FIGS. 21 and 22.

Figure 23:
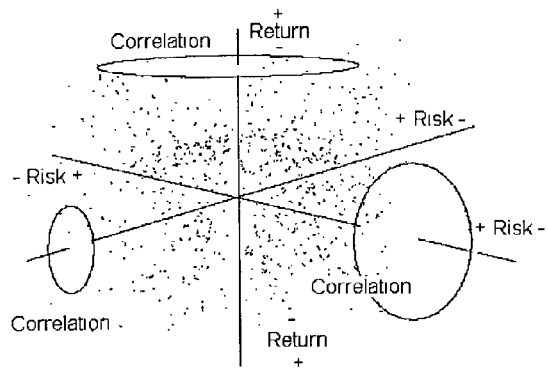
FIG. 23 shows assets plotted as a point-cloud in a three-dimensional virtual space. This depiction the user has selected two variables for the axes; risk and return.
Figure 24:
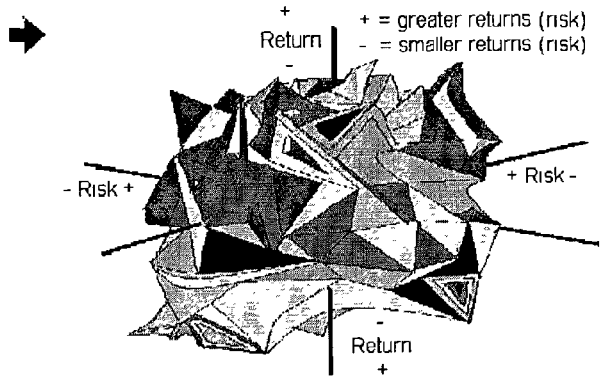
FIG. 24 shows the completed portfolio model generated by one embodiment of the invention. The surface of this model shows an alternative procedure other than the convex hull.

Other embodiments of the invention include some combination of any or all of the following additional elements of a computer implemented method and system:

(1) selecting said at least two assets based on user-defined criteria;

(2) referring to FIG. 23, plotting and displaying said at least two assets with respect to a user-defined coordinate system within said computerized virtual space;

(3) plotting and displaying said at least two assets based on error-minimization or mathematical process determining the locations of the assets in space;

(4) scaling and displaying the model coordinate systems whereby undesirable asset characteristics are located closer to the origin than desirable asset characteristics;

(5) scaling and displaying the vector components of at least one of said at least two assets;

(a) repeating error-minimization after said scaling step;

(6) plotting and displaying said at least two assets based on the risk and return characteristics of that asset;

(a) scaling said coordinate system [see number 2] such that assets with higher risk are plotted closer to the origin than assets with lower risk;

(7) referring to FIG. 24, generating and displaying a surface comprised of the exterior of said at least two plotted assets;

(8) allocating investment capital between said at least two plotted assets based on the respective locations of said at least two plotted assets;

(9) allocating capital to assets, which are non-dominated based upon the assets contribution to the volume of the model; when non-dominated means a non-inferior point; a geometric interpretation would define non-dominated as a point that has an attribute or coordinate or combination of many coordinates or attributes that are greater than or less than the rest of the data set corresponding to the results of the objective being geometrically depicted;

(10) allocating capital to assets based upon the assets Voronoi volume as a percent of volume;

(11) calculating a virtual volume contained within the exterior surface of said plotted at least two assets;

(12) assigning a virtual mass to at least one of said at least two assets based on user-defined criteria;

(13) calculating a virtual density corresponding to at least one of said at least two plotted assets based on said virtual volume and said virtual mass;

(14) storing and/or displaying said virtual volume and said virtual mass and said virtual density simultaneously with at least one of said at least two assets;

(15) displaying simultaneously and/or successively at least two representations created by the method of the present invention;

(16) testing the effect of change on a portfolio by creating a model representing said portfolio in a hypothetical changed state;

The process of portfolio creation may comprise one or more of the following steps. Each of these steps may individually comprise one or more different methods to complete it. The order listed is the preferred method but adaptations to the order are permissible.

STEP 1: GENERATION OF THE ASSET UNIVERSE
STEP 2: CREATION OF A RELATIONSHIP MATRIX
STEP 3: MODEL THE OPTIMIZATION PROBLEM
STEP 4: SOLVE THE MODEL
STEP 5: TRANSPLANT THE ASSET COORDINATES
STEP 6 SCALING THE ASSET VECTORS
STEP 7: CREATE A SURFACE AREA FOR THE MODEL AND SELECT THE EFFICEINT SET
STEP 8: DETERMINE THE MODEL VOLUME AND THE ASSET WEIGHTS

Step 1: Generation of the Asset Universe

The model graphs assets chosen for consideration by the user. The user may first select assets based on any variety of considerations. Such selection may include specific or random assets or a pre-existing portfolio. A user may also filter a database of assets to obtain lists of assets with desirable properties for their asset universe.

For instance, an investor may compare a list of securities that matched the components of a stock index, stock index options contract or another defined list of securities such as a mutual fund.

A database universe of assets could be filtered, organized, and selected based on typical investment indicators such as: industry or SIC code, assets under management, asset class, market capitalization, minimum investment required or others such as:

historical performance: arithmetic or geometric return for a given time period;

trends: an indication of the rate of change in the price or volume;

volume: the determination of the quantity of transactions or the sum of the asset exchanged for a given time period;

fund tenure: the time that asset has existed or has existed in the same or similar state;

turnover: the rate at which new assets in a portfolio replace old assets;

Sharpe ratio: (The return of the asset less the risk free rate)/the risk of the asset;

price-earnings ratio: The price of a share of stock divided by the historical, present or forecasted earnings per share;

tax efficiency: a measure of the tax liability generated and expressed as a percentage of assets;

expense ratio: the total costs associated with owning that security including transaction costs and fee;

leverage: the extent to which an asset manager controls more assets than the capital they have under management;

debt rating: the product of a rating agencies estimation of the borrower's ability to pay for existing or future debt obligations;

domicile: location of fund. Potential for tax significance;

analyst ratings: strong buy, buy, accumulate, hold, sell, strong sell or the like;

earnings growth: the rate that an asset has or is expected to increase at an annual rate;

independently-derived trading system ratings: the ability of the user to define or use any scoring or selection system that they wish; and debt to equity ratio: A measure of the extent that the income of the company is claimed by debt holders.

The user would then select assets based on any desired combination of values or ranges of these or other criteria. The screening selection methods can vary based on the users risk preferences, market outlook, strategic and tax considerations.

Step 2: Creation of a Relationship Matrix

After the asset universe has been defined, a process may be used to generate a numeric representation of the relationship between any pair of assets within the universe. The relationship of the assets may be reflective of the degree to which the assets have or can be expected to relate to one another. Derivations of such measures include the slope of a regression line, covariance, correlation, cointegration and their derivatives. Relationship may constitute other quantifications of similarity, association, implication, proportion or relativity. The model may accommodate derivates of these measures such as weighted moving averages. Numbers used as forecasts that provide the equivalence to the solution to any of these processes are often substituted. Correlation may be the preferred relationship measure; however, other relationship measurements may also be utilized.

In one embodiment, a graphical simulator comprising a computerized processor and a display device in communication with said computerized processor wherein said computerized processor is configured to accept an asset universe wherein said asset universe comprises at least two assets; construct a relationship matrix for said asset universe wherein said relationship matrix depicts a correlation computed from a correlation formula wherein said correlation formula measures the performance of each of said at least two assets from said asset universe relative to each of said other assets from said asset universe; compute a distance component and a vector component for each of said at least two assets in said asset universe for depiction in a model wherein said distance component and said vector component represents a relationship derived from said relationship matrix for each of said at least two assets in relation to each other; communicate said distance component and said vector component associated with each of said at least two assets to said display device. The model may comprise a set of axes wherein said axes represent attributes associated with a set of objectives for said asset universe. The attributes be chosen from the group consisting of expected returns, returns specifically attributable to the unique characteristics of said asset, returns derived from other sources, ratings, social responsibility, variance, credit rating, dividend yield, historical performance, fund tenure, Sharpe ratio, tax efficiency, expense ratio, leverage, debt rating, domicile, analyst ratings, earnings growth, independently-derived trading system ratings, and debt-to-equity ratio.

The size of each matrix may be a function of the number of user-selected assets to be modeled. When a user has selected N assets, each matrix has a size of N×N. The correlation matrix may be symmetric. A symmetric matrix here means that the elements of the upper right are identical to the matrix elements in the lower left. The diagonal separating the matrix is the correlation of each asset with respect to itself, and in this embodiment may be equal to one (1). These numbers need not be considered in the computation. The required inputs of the model may only require unique correlations. As such, the number of unique relationships with in the correlation matrix is equal to (N×(N−1)÷2). For illustrative purposes, this disclosure includes an example of the steps performed for a four-asset model. Consequently, in one embodiment, this example uses matrices with a size of 4×4. There is no limit on the number of assets that may be modeled using the present invention. N has no upper limit.

As used below, n and m are integers between 1 and N, inclusive. In the example, n and m are thus 1, 2, 3, or 4.

As used below, Qn may be an asset. In the model, assets are represented by vectors from the origin to the location at which the asset will be plotted. As such, qn,x is the x-component of the Qn vector, qn,y is the y-component of the Qn vector, and qn,z is the z-component of the Qn vector. A first selected asset is Q1 and has components q1,x, q1,y, and q1,z, a second selected asset is Q2 and has components q2,x, q2,y, and q2,z, and so on.

Corr(A,B,p,t) is a function representing the correlation of returns between any two assets (A and B) over a particular user-defined time period (p) and time increment (t). Thus, the correlation of returns, C, between, for example, two assets Q1 and Q2, as viewed in weekly increments over the past 10 years would be represented by: C=Corr(Q1,Q2,weekly,10 years). Each correlation may have its own unique time period and time increment. The user decides whether the correlation between the assets may be expressed as a traditional value or the value may be adjusted relative to the other correlations in the matrix. This adjustment can enhance data visualization for non-diversified asset universes.

Step 2A: Constructing the Correlation Matrix

Each element in the correlation matrix is:

$$c_{n,m} = \text{Corr}(Q_n, Q_m, p_c, t_c)$$

A correlation matrix constructed to represent the correlation of returns between four different assets might appear as follows:

$$C = \begin{pmatrix} 1 & 0.85 & 0.55 & -0.41 \\ 0.85 & 1 & 0.69 & 0.33 \\ 0.55 & 0.69 & 1 & 0.21 \\ -0.41 & 0.33 & 0.21 & 1 \end{pmatrix}$$

This matrix would indicate that over the relevant time intervals and periods, the correlation of returns between Q1 and Q2 is 0.85, between Q1 and Q3 is 0.55, between Q1 and Q4 is −0.41, between Q2 and Q3 is 0.69, between Q2 and Q4 is 0.33, and between Q3 and Q4 is 0.21. Note that because the correlation of returns between Q1 and Q2 is, logically, equal to that between Q2 and Q1, the correlation matrix and those derived therein should always be symmetrical. Further, in this embodiment, the correlation between an asset statistic and itself may be equal to 1.

Step 3: Model the Optimzation Problem

Step 3A1. Constructing the Distance Matrix

Each element in the distance matrix is:

$$d_{n,m} = |\sqrt{(q_{n,x}-q_{m,x})^2 + (q_{n,y}-q_{m,y})^2 + (q_{n,z}-q_{m,z})^2}|$$

Two alternative procedures can be used to derive the distance. The above is knows as the Euclidian distance. However, if the number of assets is substantially large that optimization process has difficulty solving for the variables two substitutions may be used. The first is referred to as a "Manhattan" distance. The Manhattan distance is the summation of the absolute value of the X, Y and Z vector component. It approximates the magnitude of the real distance. A second alternative is that of an infinity norm. An infinity norm is simply the greatest value of any one of the X, Y or Z vector components.

Because obtaining q1,x, q1,y, etc., is the goal of the present methodology, a distance matrix may be constructed to represent the distances between the vertices of four different asset vectors. An example of such a distance matrix is depicted below.

$$D = \begin{cases} |\sqrt{(q_{1,x}-q_{1,x})^2+(q_{1,y}-q_{1,y})^2+(q_{1,z}-q_{1,z})^2}| & |\sqrt{(q_{1,x}-q_{2,x})^2+(q_{1,y}-q_{2,y})^2+(q_{1,z}-q_{2,z})^2}| & \ldots \\ |\sqrt{(q_{2,x}-q_{1,x})^2+(q_{2,y}-q_{1,y})^2+(q_{2,z}-q_{1,z})^2}| & |\sqrt{(q_{2,x}-q_{2,x})^2+(q_{2,y}-q_{2,y})^2+(q_{2,z}-q_{2,z})^2}| & \ldots \\ |\sqrt{(q_{3,x}-q_{1,x})^2+(q_{3,y}-q_{1,y})^2+(q_{3,z}-q_{1,z})^2}| & |\sqrt{(q_{3,x}-q_{2,x})^2+(q_{3,y}-q_{2,y})^2+(q_{3,z}-q_{2,z})^2}| & \ldots \\ |\sqrt{(q_{4,x}-q_{1,x})^2+(q_{4,y}-q_{1,y})^2+(q_{4,z}-q_{1,z})^2}| & |\sqrt{(q_{4,x}-q_{2,x})^2+(q_{4,y}-q_{2,y})^2+(q_{4,z}-q_{2,z})^2}| & \ldots \end{cases}$$

Because precise calculation of the asset vector components may not be possible in multi-dimensional space (including but not limited to two or three dimensions), the user/system must assign vector components to each asset (i.e. assign initial values for q1,x, q1,y, etc.), calculate the resultant total error (see Step 4), and iteratively or non-iteratively adjust the vector component values to minimize the total error. In one embodiment, the asset vector components will be displayed in a sphere model. In such an embodiment the initial vector component values for any given asset Qn may be subject to the following spherical constraint: $q_{n,x}^2+q_{n,y}^2+q_{n,z}^2=1$. This embodiment, if let unadjusted secures that an investor has no preference for any individual asset, and seeks to model the portfolio with sole respect to diversification. Therefore, the initial values, for this embodiment, are comprised of the range of $-1<q<1$. Vector may generally refer to both angle and distance.

Step 3a2: Constructing the Target Matrix

Each element in the target matrix is simply:

$$t_{n,m}=1-c_{n,m}$$

This is a correlation normalization step. FIG. 25

The target matrix indicates the ideal dimensional distances between each set of assets as represented by the completed model. Using the sample correlation matrix given above (in Step 1), the corresponding target matrix would be:

$$T = \begin{pmatrix} 0 & 0.15 & 0.45 & 1.41 \\ 0.15 & 0 & 0.31 & 0.67 \\ 0.45 & 0.31 & 0 & 0.79 \\ 1.41 & 0.67 & 0.79 & 0 \end{pmatrix}$$

In this example, the dimensional distance between $Q_1$ and $Q_2$ should be 0.15, between $Q_1$ and $Q_3$ should be 0.45, between $Q_1$ and $Q_4$ should be 1.41, between $Q_2$ and $Q_3$ should be 0.31, between $Q_2$ and $Q_4$ should be 0.67, and between $Q_3$ and $Q_4$ should be 0.79. The distance between an asset relationship and itself may be equal to zero.

In this embodiment, the correlation matrix should be solved before constructing the target matrix. It would not be necessary, however, to solve the distance matrix before the target matrix or vice versa.

Step 3a3 Constructing the Error Matrix

The goal of this methodology is to determine values for $q_{1,x}$, $q_{1,y}$, etc., such that when those values are substituted into the distance matrix, each element in the distance matrix is equal to the corresponding value in the target matrix. However, precise calculation of the asset vector components may not be possible because the nature of the methodology creates so many constraints that feasible solutions may not be possible with out violating one or more of the constraints. Consequently, to determine the asset vector components, some error ($e_{n,m}$) must be allowed in those equations. Thus:

$$t_{n,m}=d_{n,m}+e_{n,m}$$

The error matrix thus represents the difference between the desired distances between the assets in the completed model (i.e. the elements of the target matrix) and the actual distances between the assets when given a set of asset vector components to create a model (i.e. the corresponding elements of the distance matrix). Restated:

$$e_{n,m}=t_{n,m}-d_{n,m}$$

Following further the 4-asset example from above:

$$E = \begin{cases} 0 & 0.15 - \left| \sqrt{(q_{1,x}-q_{2,x})^2+(q_{1,y}-q_{2,y})^2+(q_{1,z}-q_{2,z})^2} \right| & \ldots \\ 0.15 - \left| \sqrt{(q_{2,x}-q_{1,x})^2+(q_{2,y}-q_{1,y})^2+(q_{2,z}-q_{1,z})^2} \right| & 0 & \ldots \\ 0.45 - \left| \sqrt{(q_{3,x}-q_{1,x})^2+(q_{3,y}-q_{1,y})^2+(q_{3,z}-q_{1,z})^2} \right| & 0.31 - \left| \sqrt{(q_{3,x}-q_{2,x})^2+(q_{3,y}-q_{2,y})^2+(q_{3,z}-q_{2,z})^2} \right| & \ldots \\ 1.41 - \left| \sqrt{(q_{4,x}-q_{1,x})^2+(q_{4,y}-q_{1,y})^2+(q_{4,z}-q_{1,z})^2} \right| & 0.67 - \left| \sqrt{(q_{4,x}-q_{2,x})^2+(q_{4,y}-q_{2,y})^2+(q_{4,z}-q_{2,z})^2} \right| & \ldots \end{cases}$$

Step 3a4. Iterative Adjustment to Minimize Total Error

The total error, S, is $$S = \sum_{n=1}^{N} \sum_{m=1}^{N} |e_{n,m}|$$

Following the example from the previous steps:

$S=0+(0.15-|\sqrt{(q_{2,x}-q_{1,x})^2+(q_{2,y}-q_{1,y})^2+(q_{2,z}-q_{1,z})^2}|)+(0.45-|\sqrt{(q_{3,x}-q1,x)^2+(q_{3,y}-q_{1,y})^2+(q_{3,z}-q_{1,z})^2}|)+(1.41-|\sqrt{(q_{4,x}-q_{1,x})^2+(q_{4,y}-q_{1,y})^2+(q_{4,z}-q_{1,z})^2}|)+$ Because precise calculation of the asset vector components may not be possible for the reasons described above, the user must assign vector components to each asset (i.e. assign initial values for q1,x, q1,y, etc.) and calculate the resultant total error. The user then iteratively or non-iteratively adjusts the vector component values to minimize the total error.

In one embodiment, the initial, iterative, and final vector component values for any given asset Qn are subject to the following spherical constraint:

$$q_{n,x}^2+q_{n,y}^2+q_{n,z}^2=1$$

This constraint may be added if the user wishes to build an unadjusted diversified portfolio. That is, the user has no preference or expectation of one asset over another. This constraint may be used by any practitioner who believes that markets are themselves efficient and thus impossible to predict.

Furthermore, in one embodiment the initial, iterative, and final vector components may be subjected to additional user-imposed constraints such as:

$$_{min}q_{n,x} \leq q_{n,x} \leq _{max}q_{n,x}$$

$$_{min}q_{n,y} \leq q_{n,y} \leq _{max}q_{n,y}$$

$$_{min}q_{n,z} \leq q_{n,z} \leq _{max}q_{n,z}$$

The error matrix representing the solution for the example followed herein (i.e. the total error may be minimized) would appear as follows:

$$E = \begin{pmatrix} 0 & -0.05 & 0.11 & 0.002 \\ -0.05 & 0 & 0.073 & 0.155 \\ 0.11 & 0.073 & 0 & 0 \\ 0.002 & 0.155 & 0 & 0 \end{pmatrix}$$

Where the first row represents the vector components of Q1, the second row represents the vector components of Q2, and so on, the following matrix represents the vectors arrived at by the method of one embodiment of the present invention to reach the error matrix shown above:

$$Q = \begin{pmatrix} 0.43 & -0.55 & -0.21 \\ -0.65 & 0.56 & 0.87 \\ 0.42 & -0.72 & 0.19 \\ 0.04 & -0.07 & 0.84 \end{pmatrix}$$

The invention accommodates a variety of mathematical procedures than enable the creation of the model. In another embodiment, an angle matrix could replace the distance matrix. The angle matrix would represent the correlation between asset statistics in terms of degrees, radians, sines or cosines instead of as a dimensional distance. A radian is the angle that intercepts an arc of a length equal to the radius same of the circle.

Figure 26:
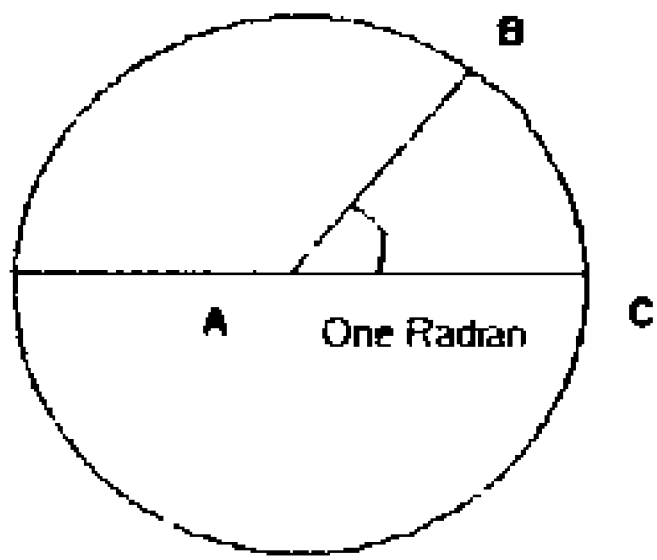
FIG. 26 shows the circular system of angular measurement.

1. Length of arc BC=radius of circle
2. 6.28 radians=360°
3. 2☐ radians=360°
4. radians=180°
5. radian=57.2957795°
6. degree=0.01745 radian Referring to FIG. 26 (Radians), the steps described herein would be carried out in like fashion, with the correlation between assets in the completed model represented by the angles between the respective asset vectors instead of the distance between the vertices of the asset vectors.

One version of this model again begins with correlations or correlation estimates 1. Take correlations or relationship obtained from the universe.
2. Normalize and invert correlations to create all positive values. Execute by subtracting each correlation from 1. Divide every value by 2.
3. The correlations are now all positive values between 0 and 1.
4. Multiply each correlation by Pi. The result is a radian that depicts every correlation pair as a set of two vectors with the arc of the vector pair commensurate with the correlation of the assets prices. A correlation that was once 1 has an angle and radian of 0 and a correlation that was once −1 has an angle of 180 or a radian of Pi.
5. Repeat this process until all correlations for all the assets under consideration are expressed as a radian, angle, sine or cosine.
6. Set each the bounds for each vector. Vectors may be set as a unit vector or the user selected modeling variables may be selected. These are expressed as constraints. Iteratively or non-iteratively adjust each radian. The assets' X, Y and Z locations are optimized. The optimization of this form requires a non-linear solver, meta-heuristic procedures, genetic algorithms or combinations of the above techniques. A meta heuristic is a procedure for performing exhaustive searches in a space. It iteratively samples from that space, and uses a wide variety of decision techniques to attempt to determine if a sufficiently desirable point has been found. If such a point is found, or sufficient computational effort has been expanded, it stops. Otherwise, it uses the information collected to influence future sampling.
7. Determine the total difference (sum of the difference between each element between the correlation given radians and the radians derived by adjusting the plot locations during the optimization
8. Continue the optimization process until the solver has converged on a solution, ran out of time allotted or finished a defined number of iterations necessary to expect a satisfactory solution.
9. Choose the smallest total difference minimization solution and take the asset plot locations that are generated as a result of solving the model.
10. Take the plot locations and rescale as necessary to match asset characteristics with choose criteria, if not previously scaled.

Due to the uniformity of cosines with any positive coefficient in that the graphic representation best approximates our desired effect; cosines are the preferred embodiment of the invention.

Another variation on the above embodiments is derived when the asset vector lengths are constrained to unit vectors or otherwise assigned to their respective distance given by the chosen criteria prior to optimization or iterative procedure.

An alternative model creation procedure comprises:
1. A process where each asset plot location is graphed.
2. The components of the assets (X, Y, Z coordinate values) are inputted into a correlation formula for every pair of assets. Essentially each asset's X, Y and Z vector component are placed in the correlation formula just as a specific asset price would be.
3. A correlation formula is executed for each coordinate and a correlation is obtained.
4. The process is repeated until all of the relationships between all of the coordinates have been expressed as correlations.
5. That correlation obtained from the coordinates is compared to the historical or estimated correlation.
6. The sum of the differences is totaled. To eliminate negatives the preferred process is to take the sum of the square of the differences. Similarly, the absolute value would suffice. Any non-positive values are adjusted prior to the summation so that the summation obtains a total for the differences regardless of the sign.
7. The assets' plot locations are adjusted to minimize the total difference.

Another model embodiment is created using the following procedure:
1. Vectors are created in N-Space. The dimensionality is one less than the number of asset.
2. Vector lengths are provided by user defined criteria, or set as unit vectors if no preference exists.
3. The convex hull is determined in said N-space. The inclusion of the origin provides a volume by increasing the number of plots 1 in excess of the dimensionality of the space.
4. The model is displayed in two or three dimensions using linear algebraic projection.

Projections into a subspace: A vector v in a vector space V can be projected into a subspace S of V having an orthogonal basis {v1, v2, . . . , vk} by summing up the projections of v over each basis vector vi in the basis. If, the basis vectors all have length one, then the basis is said to be orthonormal, and the formula for the projected vector can be further simplified to: $\text{proj}_S v = (v \cdot v1)v1 + (v \cdot v2)v2 + \ldots + (v \cdot vk)vk$. A basis for S can be made into an orthonormal basis by using the Gram-Schmidt Orthonormalization process. Given a basis B, the process works as follows:

Let E be a set (initially empty) of basis vectors that are to become the new basis.

While B is not empty, remove a vector $v_i$ from B, subtract from $v_i$ its components with respect to each of the vectors in E, then add the resulting vector $v_i'$ to E.

Divide each vector in E by its norm.

E is now an orthonormal basis for the space spanned by B before applying the process.

5. The projection may be repeated to correspond to each unique viewpoint that the user views the model from.
6. A variation on this model includes one or more linear projections prior to the determination of the convex hull and the volume of the convex hull. Allocations are obtained in this fashion by averaging the allocation achieved for each observation. Therefore the greater the number of observations, the more accurate the allocation obtained.

In another embodiment, a fifth procedure is as follows: Take the correlation matrix and transform to normalized values as in the previous examples.
1. Set the correlation matrix of the X Y and Z coordinates equal to the determined values. This is the same technique described in X, Y, Z correlation steps 2-6.
2. Enter this equality as an optimization constraint for the model.
3. Define the objective function as a maximization of the volume of the convex hull.

Step 5: Transplant the Asset Coordinates

The assets may then be plotted as a point-cloud in a dimensional virtual space based on the vector components derived from one of the error-minimization methods above (e.g. asset Q1 above would be plotted at (0.43, −0.55, −0.21)). The method described above assumes that the dimensional virtual space is mapped using a Cartesian coordinate system, but the methodology applies similarly to dimensional spaces mapped using, for example, polar or spherical coordinate systems. These graphing techniques are known in the art. Accordingly, the user may define the type of coordinate system to be used in creating the model as well as the scales on which the model will be plotted. A modification of the traditional implementation of the Cartesian coordinate system may be used as the normal embodiment of the invention. Typically, the coordinate system will have values that increase from left to right, down to up or back to front. In one embodiment, after the asset coordinate relationships have been obtained, (assuming vector scaling has not taken place prior to or concurrent with optimization) the vectors may be transplanted into a new coordinate system that has more positive or otherwise more attractive values farther from the origin. As such, in order to maintain maximum visual integrity, the X, Y and Z-axes are each symmetrical about the origin. If a variable is modeled in two axes the variable is simultaneous symmetric to both axes.

Step 6: Scaling the Asset Vectors

Once the components of each asset vector have been determined, the magnitude of any particular vector can be adjusted by re-scaling any or all of the components of each individual asset vector. The user may select which vector magnitudes and/or components to adjust as desired. Accordingly, in one embodiment, a user may desire for assets with the greatest value to be displayed most prominently by the model. As such, the user would multiply all the vector components of each asset by some factor directly depending upon the relative price of the individual asset. The plot will normally be scaled so that the most desirable values of any particular metric are located farthest from the origin of the asset plot.

The variables depicted in the model's axes are scaled. It would be impractical to model one variable with a range of observation from 1 to 4 with another variable (axis) with arrange of asset from −10 to 250. There for the range of observations are scaled to reflect the relative attractiveness of the range values. For example the highest value of the range 1 may be set equidistant to the highest value of range 2.

In another embodiment, the user may prefer particular assets to be more or less prominently displayed by the model. Consequently, the user would multiply each of the vector components for any such assets by a fixed number based on the prominence with which the user desires that asset to be displayed. For example, a user may multiply all of the vector components of favored assets by 2 and multiply all the vector components of disfavored assets by 0.75.

Figure 4:
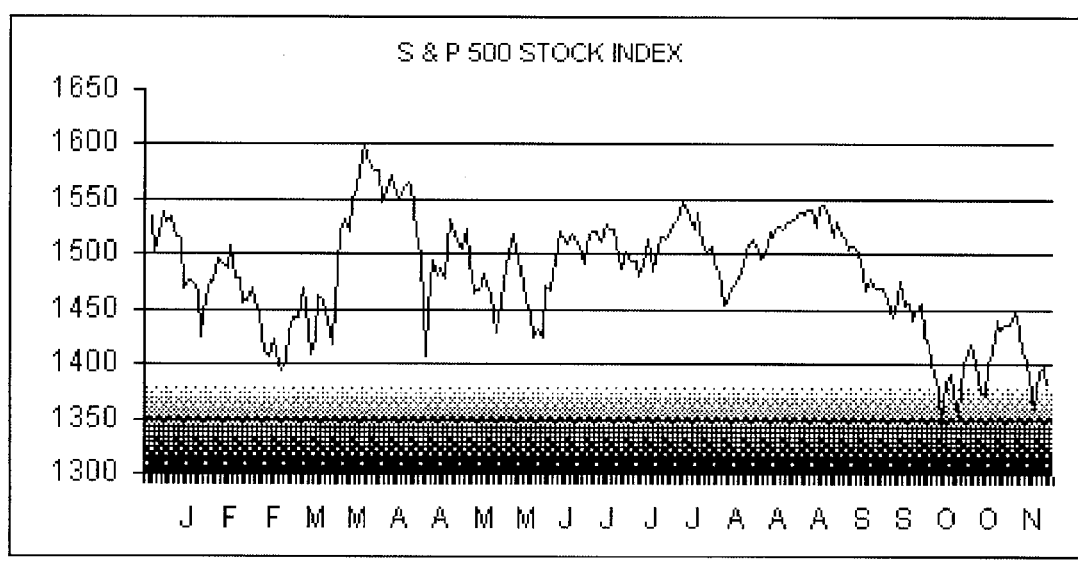
FIGS. 4-11 reference the correlation matrix given in FIG. 3.
Figure 5:
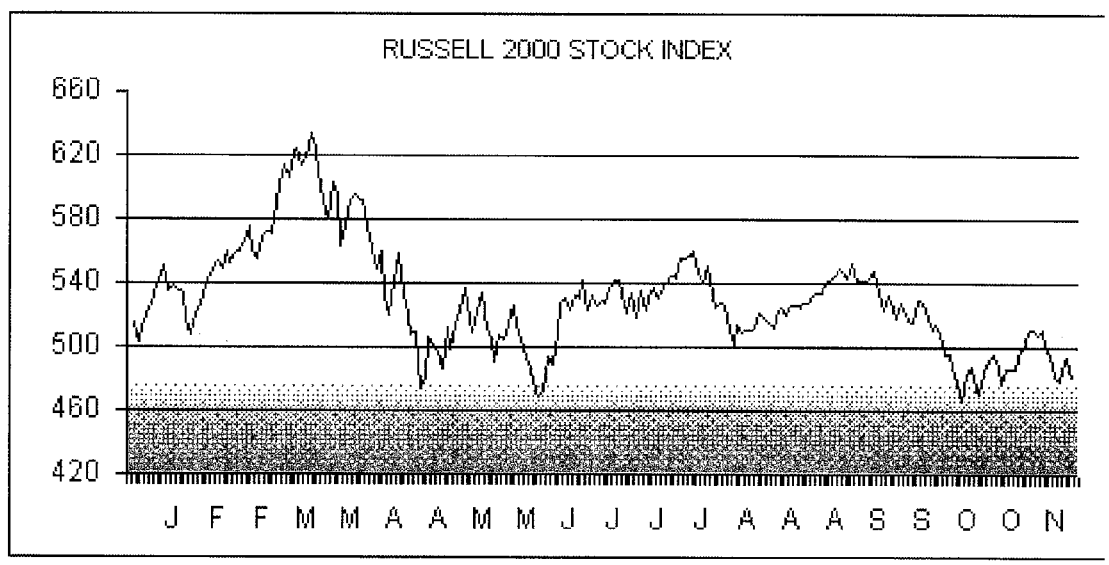
Figure 6:
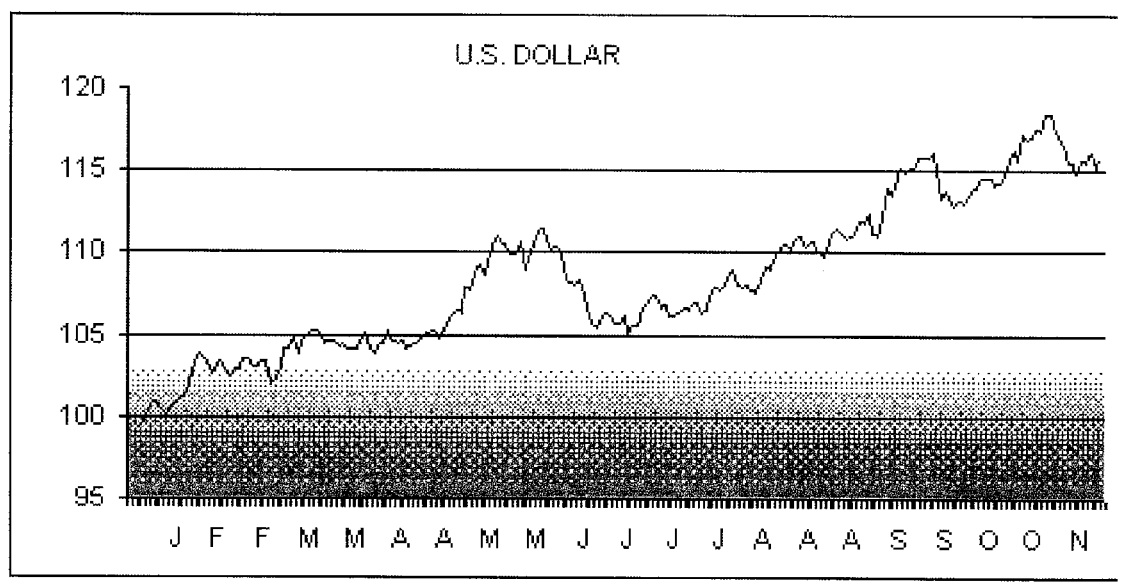
Figure 7:
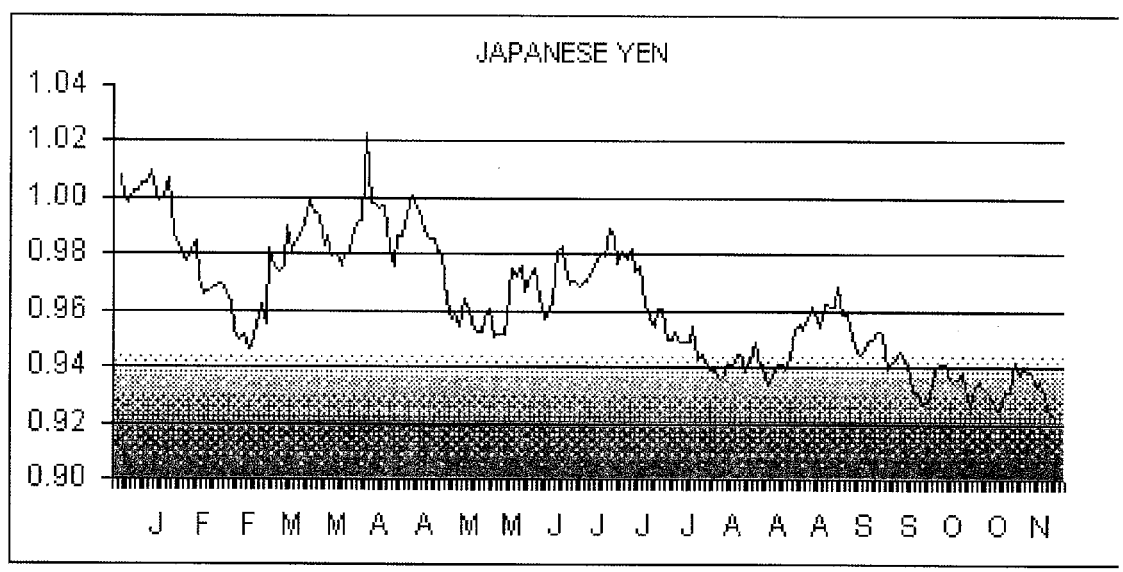
Figure 8:
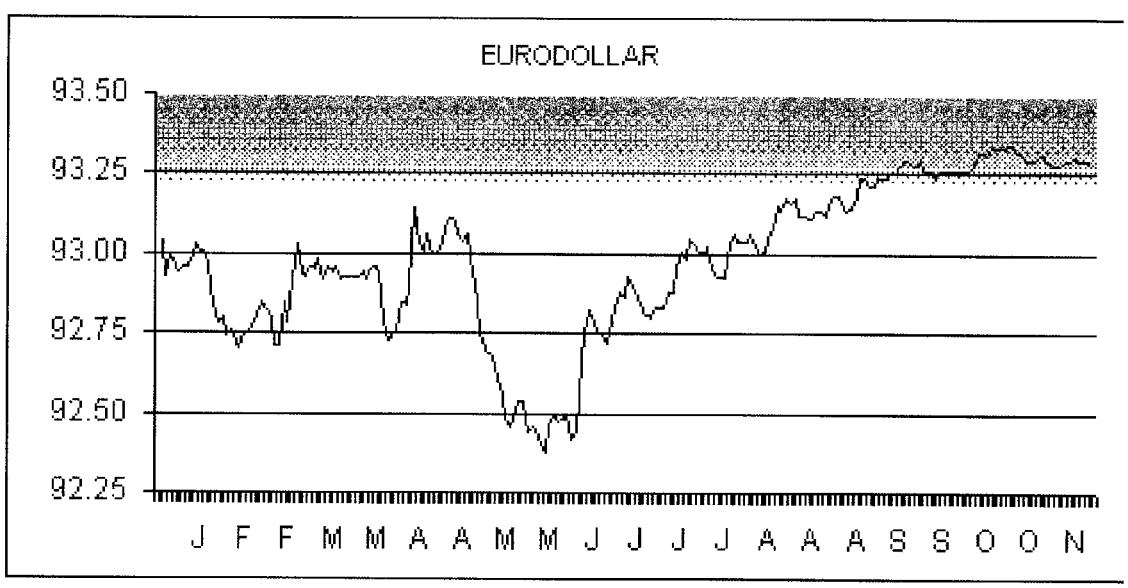
Figure 9:
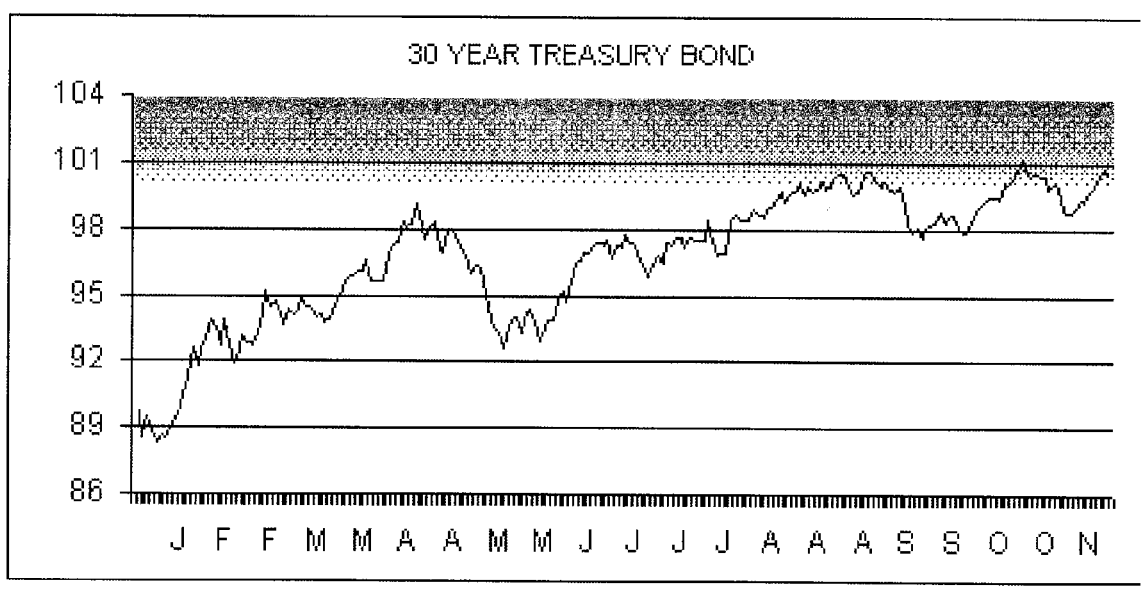
Figure 10:
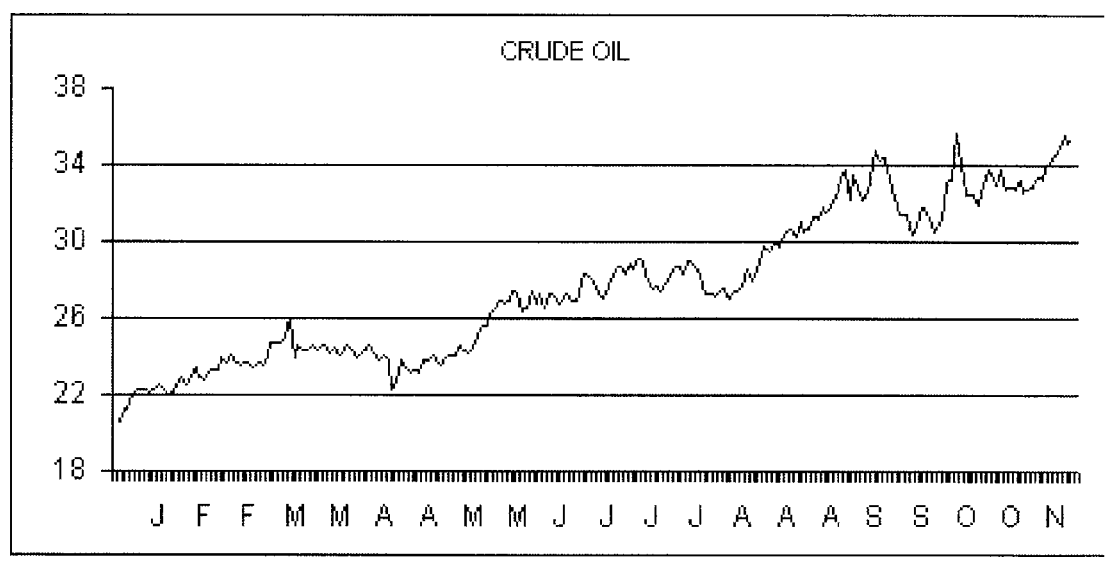
Figure 11:
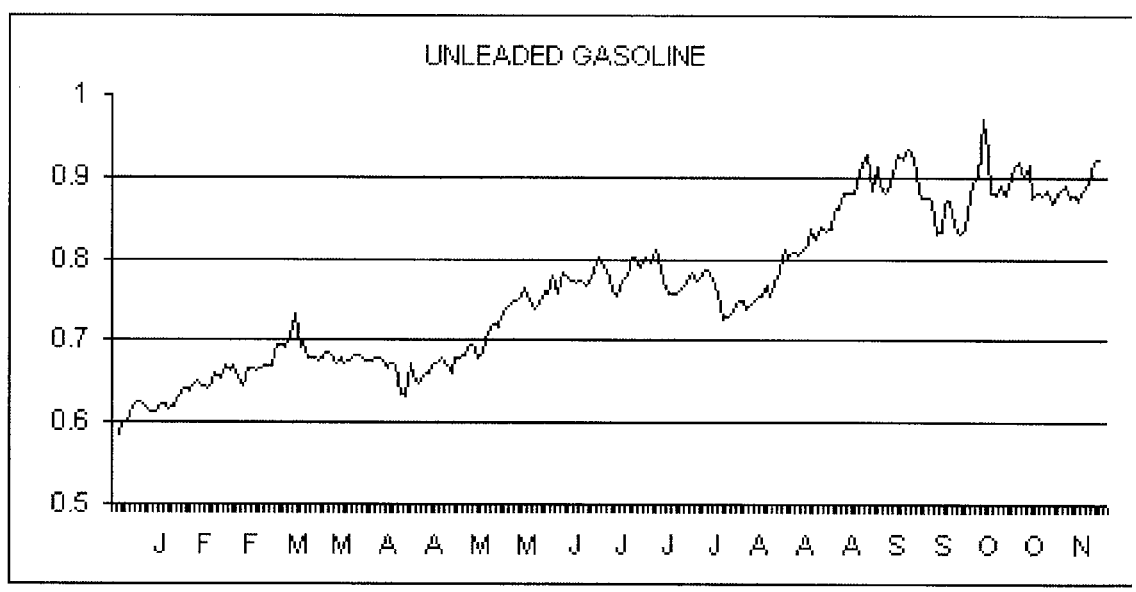
Figure 12:
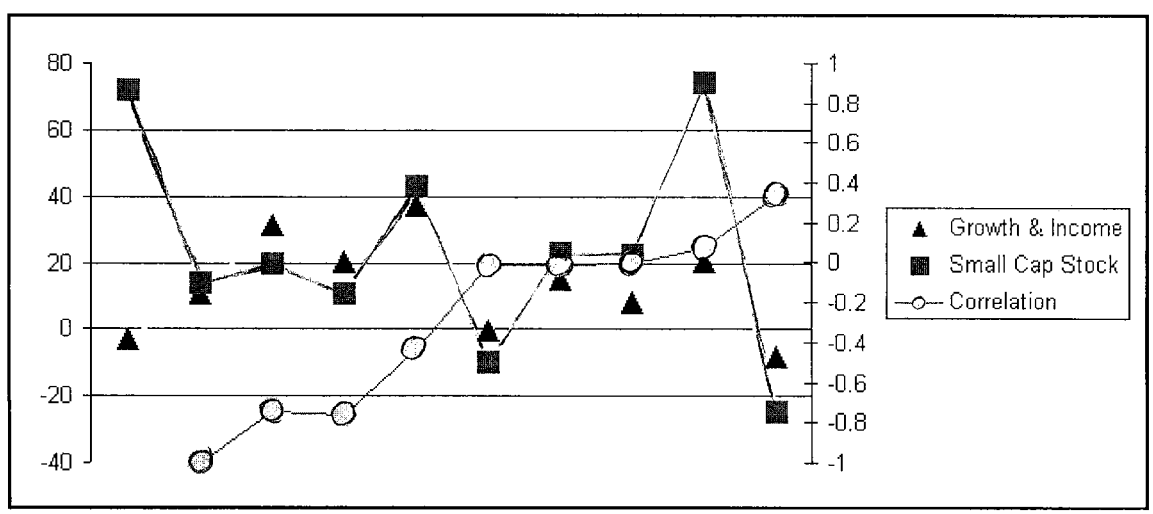
FIG. 12 shows a time series graph of two assets with a moving correlation chart.
Figure 13:
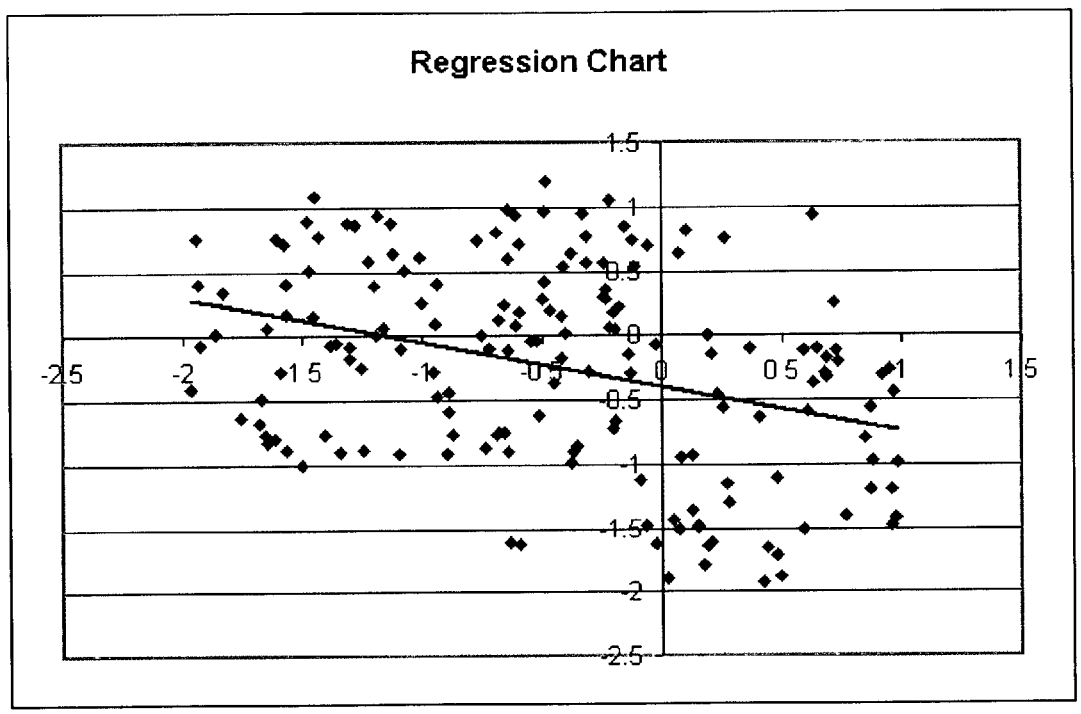
FIG. 13 shows a regression line created using the least squares method.

The ranges of values are similarly scaled for the worst values of the range. Distance may be a measure of attractiveness. Larger values for instance, expected returns are farther away, but sometimes, larger values are less attractive (variance). When this is the case, the range is first inverted to ensure that the best values are most distant and the worst values are nearer to the origin. Rescaling the assets may morph the spherical model into a polyhedron model as depicted in FIG. 4. Thus, the user/viewer may visually determine which assets have been given greater weight.

Axis range values are scaled to show equivalence. The range of values may be equaled to, greater than or less than the actual range observed within the model universe. To enhance data visualization the worst value of the range may not be set directly to the location of the origin. If the worst value was 30 and the highest 50, the origin may be set to 20.

For example, consider the case of a model portfolio depicted using the following three attributes:

| Axis | | low range value | high range value |
|---|---|---|---|
| Z | Expected returns | −5% | 200% |
| X | Variance | .03 | .75 |
| Y | Probability of a 20% return | 0% | 90% |

The axes are all aligned from best to worst values:

| Axis | | worst range value | best range value |
|---|---|---|---|
| Z | Expected returns | −5% | 200% |
| X | Variance | .75 | .03 |
| Y | Probability of a 20% return | 0% | 90% |

The ranges are then scaled to the user preference to be equivalent (i.e.: the user would be indifferent between obtaining one attribute or another):

| Axis | | Origin | High value |
|---|---|---|---|
| Z | Expected returns | −10% | 225% |
| X | Variance | 1.50 | 0 |
| Y | Probability of a 20% return | −40% | 100% |

Notice that a negative probability may be impossible. That is not relevant as only the Y-axis is being proportioned to reflect the user equivalence determination against the other axes.

Figure 27:
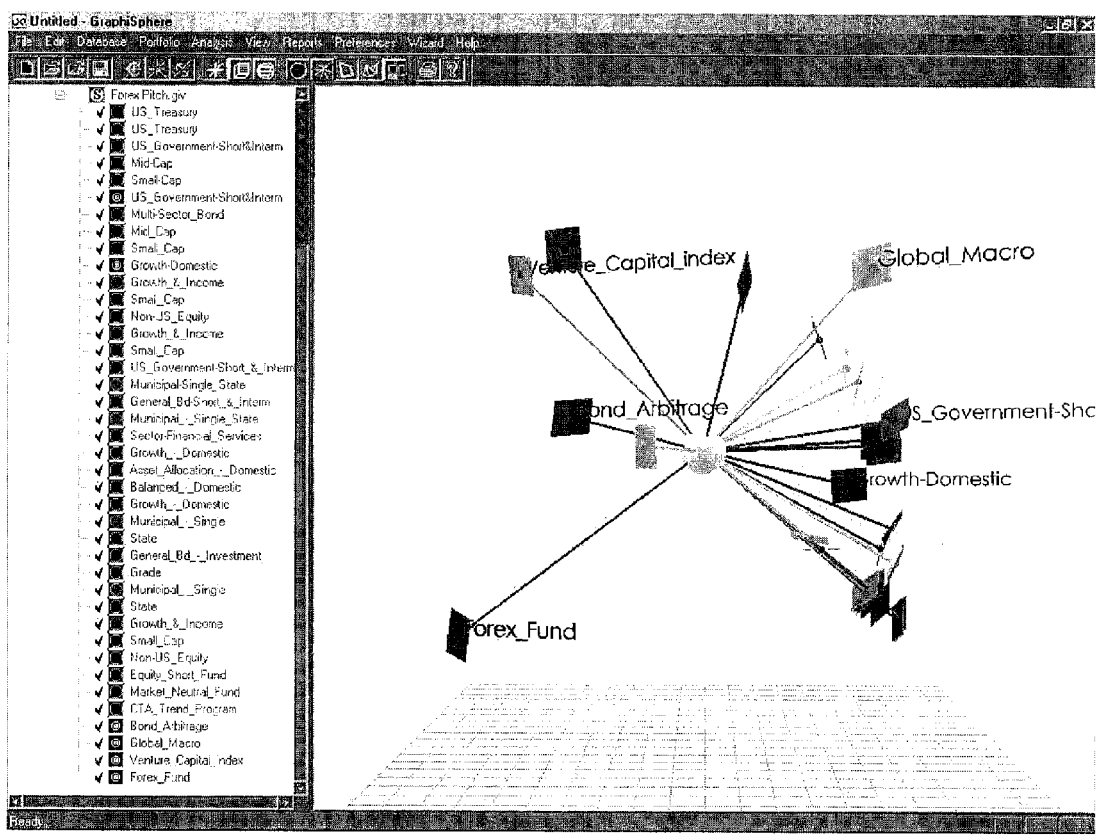
FIG. 27 shows scaled asset vectors in an embodiment of the invention wherein squares represent the assets.

Referring to FIG. 27 (Select Vectors), this figure shows that assets more distant are more likely to comprise the exterior or convex hull of the model. The asset, "Forex Fund" has a large relative distance and occupies a unique space; such assets will have a large volume attribution and consequent allocation. Re-scaling the asset vectors may have the effect of increasing the likelihood that any particular asset will be included in the efficient portfolio (i.e. comprise the surface of the model).

Depending on the model of the problem and the axis selections, it may be necessary or desirable to refine the X, Y and Z coordinates, i.e., if the vector lengths cannot be adjusted without eroding the data integrity. This can happen if separate X, Y and Z-axis definitions are chosen. After re-scaling the asset vectors, an error-minimization technique may be implemented using the re-scaled vector components as the initial vector components and imposing other constraints as the metrics the user desires the model to represent. As such, the user would select values for $_{min}q_{n,x}$, $_{min}q_{n,y}$, $_{min}q_{n,z}$, $_{max}q_{n,x}$, $_{max}q_{n,y}$, and $_{max}q_{n,z}$ based on the metrics the user desires that each vector component set would represent. Thus in one embodiment, if the user desired for the x-components of the asset vectors to represent the price-to-earnings ("P/E") ratio of each individual asset, the user would set $_{min}q_{n,x}$ as the P/E ratio of the selected asset with the lowest such ratio, and $_{max}q_{n,x}$ as the P/E ratio of the selected asset with the highest such ratio. In another embodiment the user may desire for the y-component of the asset vectors to represent the credit rating of each individual asset; the user might then set $_{min}q_{n,x}$ as the credit rating of the selected asset with the lowest such rating, and $_{max}q_{n,x}$ as the credit rating of the selected asset with the highest such rating.

In another embodiment, the user could impose additional constraints based upon the desired asset vector components with respect to a particular metric. For example, the user may prefer that the z-component of any asset vector represent, without any error, one particular asset characteristic. As such, in one embodiment of the invention, a user would simply set those respective characteristics as constraints imposed during the error-minimization step. Such an embodiment gives the user control over the vector components from which errors will and will not originate.

As used below, R represents the average periodic return of an asset and σ represents the standard deviation of the average periodic return of an asset. Thus in one embodiment, the z-axis would be used to represent R for any given asset Qn, and in such an embodiment would serve as an additional constraint to be applied during the error-minimization process:

$$R_n = q_{n,z}$$

The x- and y-axes could be used to represent σ for any given asset. In this respect, σ would constrain the location of the asset in the x- and y-directions only as much as may be necessary to fix the distance of the asset from the z-axis in the xy-plane (SEE GENERALLY FIG. 3). In such an embodiment, a further additional constraint would guide the minimization of error:

$$\sigma_n = \sqrt{q_{n,x}^2 + q_{n,y}^2}$$

Any portfolio modeling two variables can affix the data to the axes in a similar fashion to the example above. The axes may consequently be Z—XY, Y—ZX or X—ZY, where one of the two variables is depicted in two axes.

Step 7: Create a Surface Area for the Model and Select the Efficient Set

Figure 1:
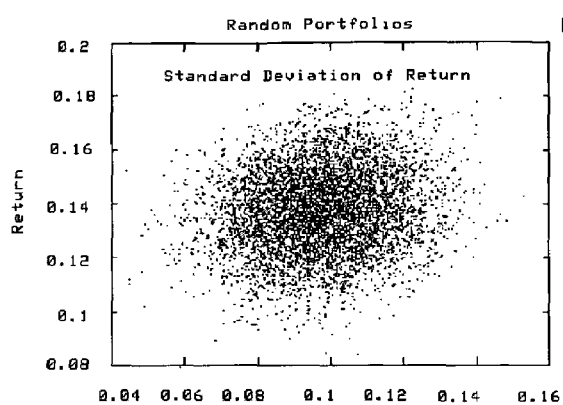
FIG. 1 shows individual assets on a two-dimensional risk-return plot.
Figure 2:
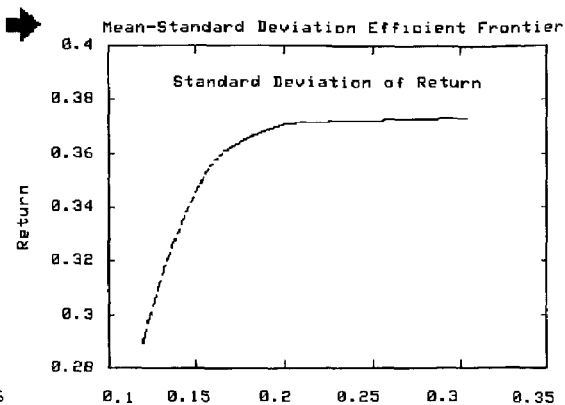
FIG. 2 shows the efficient frontier.
Figure 28:
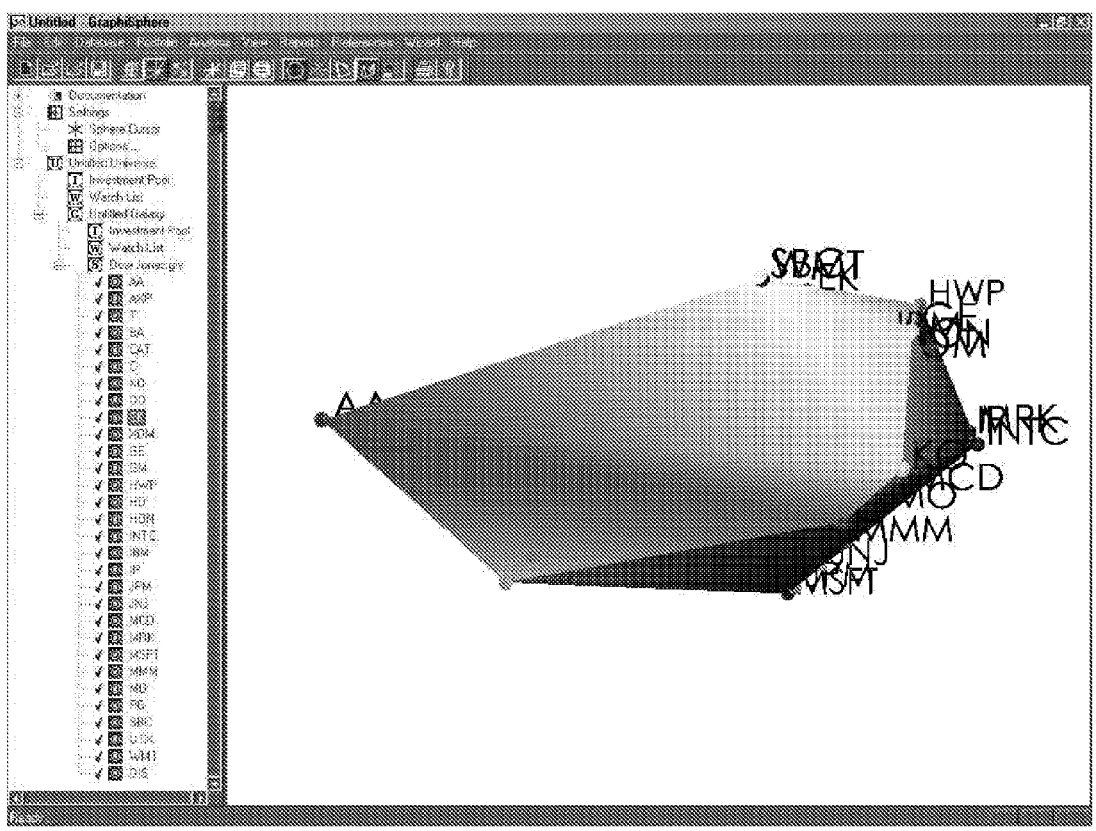
FIG. 28 shows the convex hull comprised of the efficient set selected from the universe of Dow Jones Industrial stocks.
Figure 29:
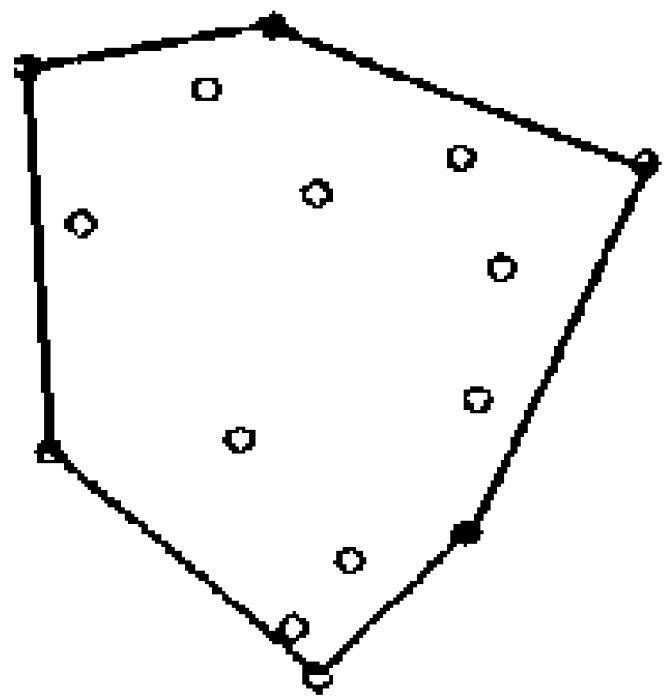
FIG. 29 shows a simple convex hull in two dimensions.
Figure 30:
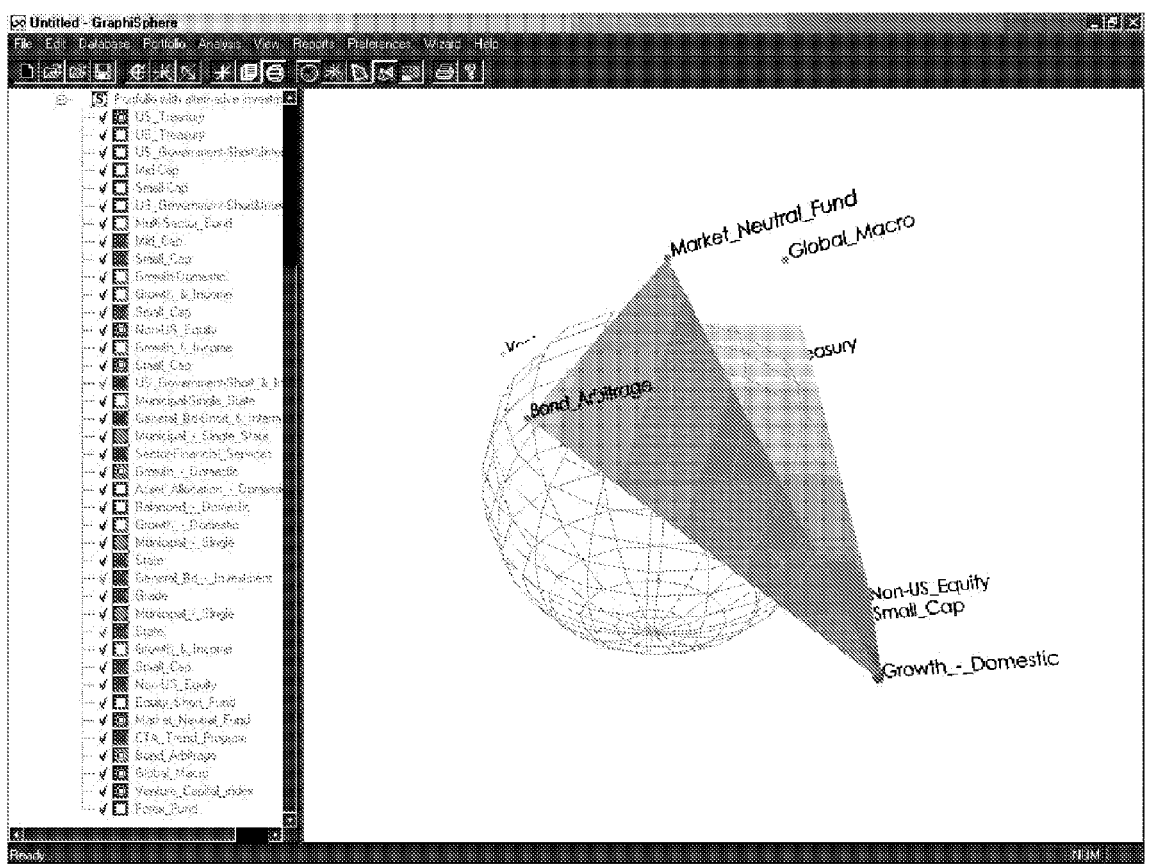
FIG. 30 an investor or analyst can quickly look at the portfolio and its symmetric properties to understand the diversification offered.

A surface may be generated from the exterior assets of the model. Referring to FIG. 28 (Efficient), this shows the model's exterior surface comprising and determining the efficient assets of the represented portfolio. Referring to FIG. 29 (2D Hull), this shows the preferred method to create a surface of the model defined by the convex hull of the point cloud. FIG. 29 2D Hull The convex hull of a set S may be the set of points that can be written as affine combinations of points in S. An affine combination is a linear combination where: all the coefficients are between 0 and 1, including 0 and 1; and the sum of the coefficients is 1. A linear combination is a weighed sum of vectors v1, v2, ..., vk, with scalar weights α1, α2, ..., αk. Generally, a convex hull may be the smallest containment of an entire set within its space. The convex hull may be visually tantamount to drawing a line to and from each point within the point cloud, then selecting everything inside the lines. When a convex hull is in three dimensions this same process would be repeated for every possible viewpoint. The model of the surface depicts the efficient portfolio and selects the efficient set. The shape of the convex hull provides a visual explanation of diversification. The shape may be compared to any symmetrical object placed on the graph that has the origin at the center. Referring to FIG. 30 (Symmetry), this figure shows the extent to which the model is asymmetrical with respect to the origin is indicative of the balance achieved in the portfolio. FIG. 30 Symmetry There are many processes used to create and define the convex hull. Many algorithms are available to create the convex hull including quickhull, gift wrapping, divide and conquer, Graham's algorithm and the incremental algorithm. Most of these algorithms can be implemented in a two-dimensional space, three-dimensional space or higher-dimension N space.

Step 8: Determine the Model Volume and the Asset Weights

The volume attribution of any efficient asset may be equal to that assets portfolio weight. There are a few different processes for computing volumes that are known in the art that may be applied to the models created by various embodiments of the invention.

Sequential Deletion Method

Upon definition of the model's convex hull, a volume computation may be executed. A volume can be determined easily for any polyhedron. If the surface exhibits no curvature the volume can be determined using convex hull triangulation volume. This is a common practice that divides a polygon into tetrahedrons and sums the volume or area for each unique region. If the surface contains curvatures the volume is divided into tetrahedrons and summed and any remaining areas containing curved surfaces have their integrals computed and added to the total.

Upon creation of a volume of the model, each efficient asset is deleted; the new volume of the new model is derived using the same process. The deleted asset is then added back and the process is repeated until the allocation is complete— when each efficient asset has a determined allocation.

The difference of the original (complete) model and the model with the asset deleted may be taken. That difference may be divided by the original total volume. Another variation may occur if the user decides to sequentially delete assets and create a new optimization for each iteration. The allocations are subsequently provided from the change in volume from the original to the reoptimized and that value is divided by the total volume. This ratio determines the allocation of the asset in the efficient set.

Preferably, the user may elect to delete all inefficient assets prior to this step. Deleting inefficient assets prevents a previously inefficient asset from becoming non-dominated and contributing to the volume during the temporary deletions of any of the efficient assets. Other simulation embodiments may retain the interior coordinates.

Voronoi Volume

The volume attribution may also be obtained using the Voronoi space. Voronoi space is the area surrounding any one asset that is closer to that asset than any other is. To execute the Voronoi volume the user must first again delete the interior or inefficient assets. The Voronoi space is bound to the convex hull or surface of the model. Asset weights are obtained by dividing each efficient asset's Voronoi space by the sum of the entire space.

Attributable Distance

The model creates an optimum allocation of capital between the efficient assets. The preferred methodology is a six-step process. First, the user calculates the distance between each set of efficient assets. Second, the user calculates the sum of the distances from the first step, being certain to eliminate any redundancies. This gives total distance (G). Third, the user calculates the sum of the distances between each particular efficient asset and its adjacent, efficient counterparts (H1 for a first asset, H2 for a second asset, etc.). Fourth, the user divides each such sum, Hn, by a distance-adjustment factor. For any convex polyhedron, each asset will have three adjacent counterparts; in such a case, the distance-adjustment factor is two (2.0). Fifth, the user divides each result by the total distance (G). This process generates a number between 0 and 100 for each efficient asset, representing the percentage of capital that should be invested in each efficient asset to properly balance the represented portfolio.

Figure 31:
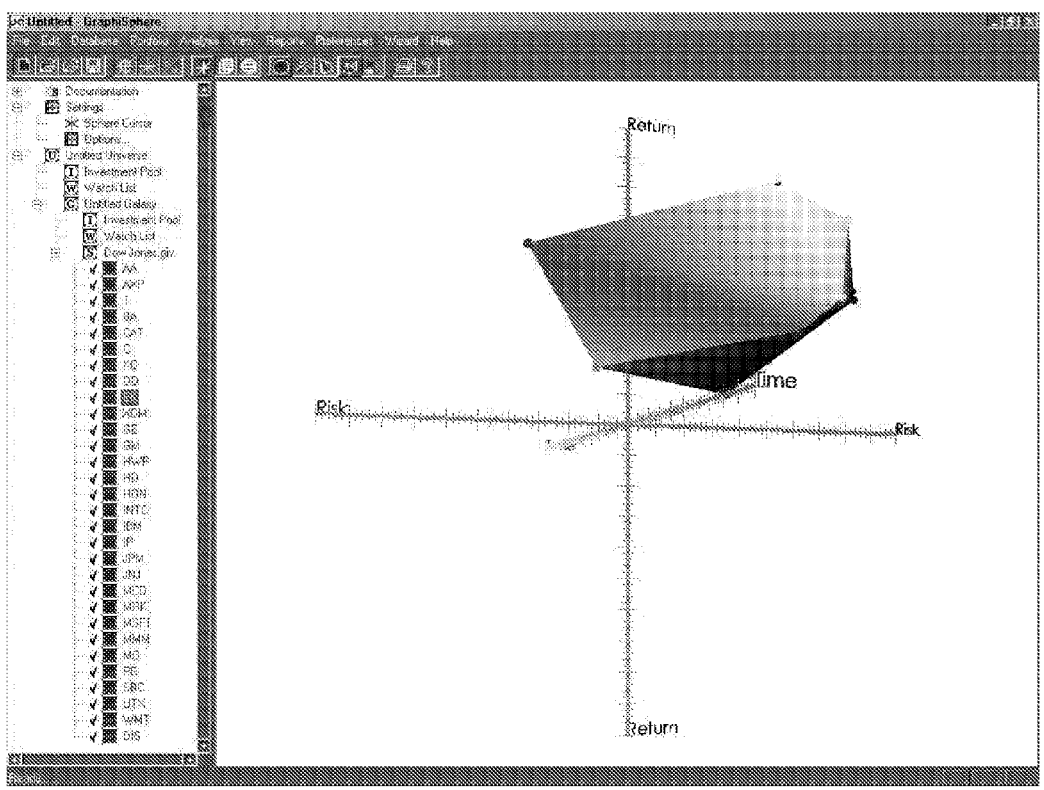
FIG. 31 shows a portfolio of assets in which the origin is exterior to the model.
Figure 32:
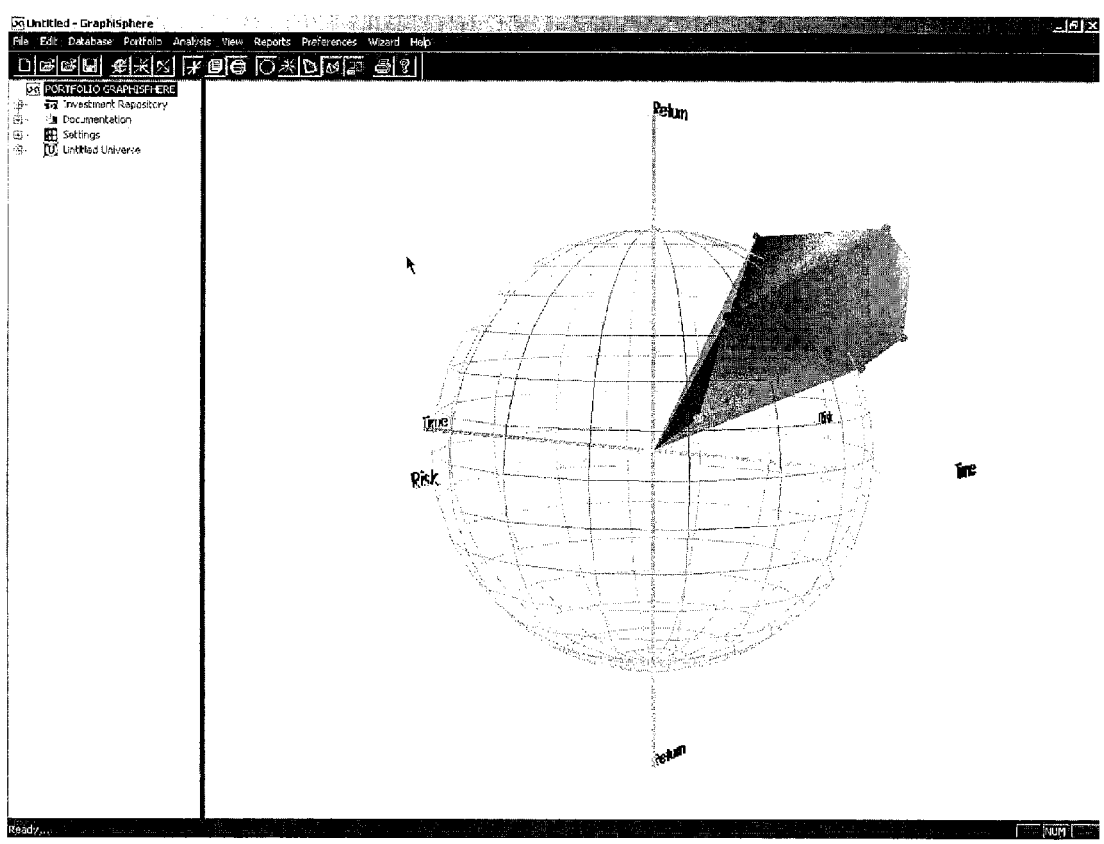
FIG. 32 shows the same portfolio listed in FIG. 31 with an origin included in the exterior. Some assets that were on the hull are now covered and regarded as inefficient.

A special circumstance occurs under any of the allocation methods when the origin is not interior to the convex hull. (FIG. 31 Exterior Origin) In such models, the user can select the origin as though it was a component of the portfolio. The origin can be determined to be equivalent to a risk free asset, cash or another measure such as inflation. Cash is the preferred embodiment. The origin is included to prevent inefficient assets from being included in the efficient set. (FIG. 32 Origin Inclusion) An asset that is dominated, but appears as a component of the convex hull is thereby eliminated from the convex hull. For example, imagine an origin and a sphere in space near the origin, not unlike the sun representing the origin and the earth as the sphere or the portfolio. Because the sun is not interior to the earth, many of the assets comprising the surface area of the earth have another asset with the same vector, but a different magnitude. In our Earth example any asset contained within the surface of the Earth that is light by the sun has a similarly correlated asset counterpart on the far side of the model that has a more attractive distance measurement.

The origin may demand an allocation in excess of practical percentages. This can occur if the investor fails to build a well diversified portfolio, yet has a high risk tolerance, or it could occur if the origin were set to a variable that was not an investable asset. In such circumstances, the allocation may be obtained in the same manner for all assets, including the origin. The origin allocation may then be redistributed on a pro rata basis to all the efficient assets. This may be accomplished by taking each assets allocation and dividing that allocation by the percentage of the portfolio that remains after omitting the origin. The denominator is as follows: (Total portfolio−allocation to origin)/total portfolio.

For example:

|         | Original allocation | Modified allocation | |
|---------|---------------------|---------------------|--------|
| Asset 1 | 10%                 | 10%/.9 =            | 11.11% |
| Asset 2 | 10%                 | 10%/.9 =            | 11.11% |

|         | Original allocation | Modified allocation | |
|---------|---------------------|---------------------|--------|
| Asset 3 | 20%                 | 20%/.9 =            | 22.22% |
| Asset 4 | 20%                 | 20%/.9 =            | 22.22% |
| Asset 5 | 30%                 | 30%/.9 =            | 33.33% |
| Origin  | 10%                 | TOTAL               | 100%   |
| TOTAL   | 100%                |                     |        |

$1 - .1 = .9$

A second special circumstance occurs when a model has no volume. This may happen due to an insufficient number of assets or a coincidental instance of all assets being graphed about one plane. In such circumstances, if origin inclusion does not solve the problem, an area could replace the volume as the total allocation area. The allocation process is then one of area attribution.

A virtual space may be any simulation depicting correlations of assets. Virtual spaces include, by way of explanation and not by way of limitation: simulations created on a two-dimensional surface such as a sheet of paper, simulations created in the processor of a computer, simulations created on a computer display, simulations displayed over a television, simulations created with physical objects in the real world, simulations created with physical non-objects in the real world (e.g. holograms). Investment companies may use a holographic representation of the model as created with the method of the investment. The holograph could be put on a sticker and attached to a fund prospectus' or marketing material.

The invention may also be a resource allocation utility. It can allocate a wide variety of variables. In fact, any field that generates related data may discover an application for the invention. Consumer demographics, manufacturing, psychology, economics, medicine and genetics may all readily find utility in the application.

The process described here as the invention may apply to any resources whether tangible or not, economic or not. The field of resource allocation extends much beyond the scope of finance. Resource allocation problems involve determining efficient allocations for any number of variables. The most prevalent of these variables would be time, labor, budgets or capacity. For example a paper manufacturer can choose between using the resources of the paper mill to create picnic tables, computer paper or particleboard. To determine if the invention is a practical solution, the problem must quantify the relationships of the variables being solved. Second, the allocation process must benefit from diversification. An application need only discover the uncertainties to find the utility of diversification.

For instance the head of a political campaign may be identifying what positions to take on various issues to determine the best orientation for their campaign to appease the views of the electorate and the best way to design their message. Public opinion polls have provided the top 16 issues.

Air quality control
Balanced Budget
Education vouchers
Expanded scope for World Court
Flat tax
Funding for parks
Higher sin taxes
Legalized gambling
Marijuana legalization
Medical savings accounts Minimum wage abolishment
Recycling program
Social Security investment reform
Leash law for pets
Taxes cuts
Term limits A representative sampling of the voter population is polled to learn if voters who are in favor of any one issue are likely to be in favor of another issue. This creates the relationship matrix. The relationship matrix defines the likelihood that a voter in favor of one issue would also be in favor on the second issue. This relationship of the issues, just as the securities correlation may be equated to a measure or distance or angle, and the invention process creates the model and the campaign orientation.

The axis selection may be:
X—The probability of winning that issue
Y—The utility of pursuing the issue
Z—The risk associated with championing the issue
The axis values are then defined for each issue.

The allocation procedure of the invention may then be used to create the efficient political campaign. The resources of the campaign may then be expended using the same volume attribution employed in an asset allocation model.

Figure 33:
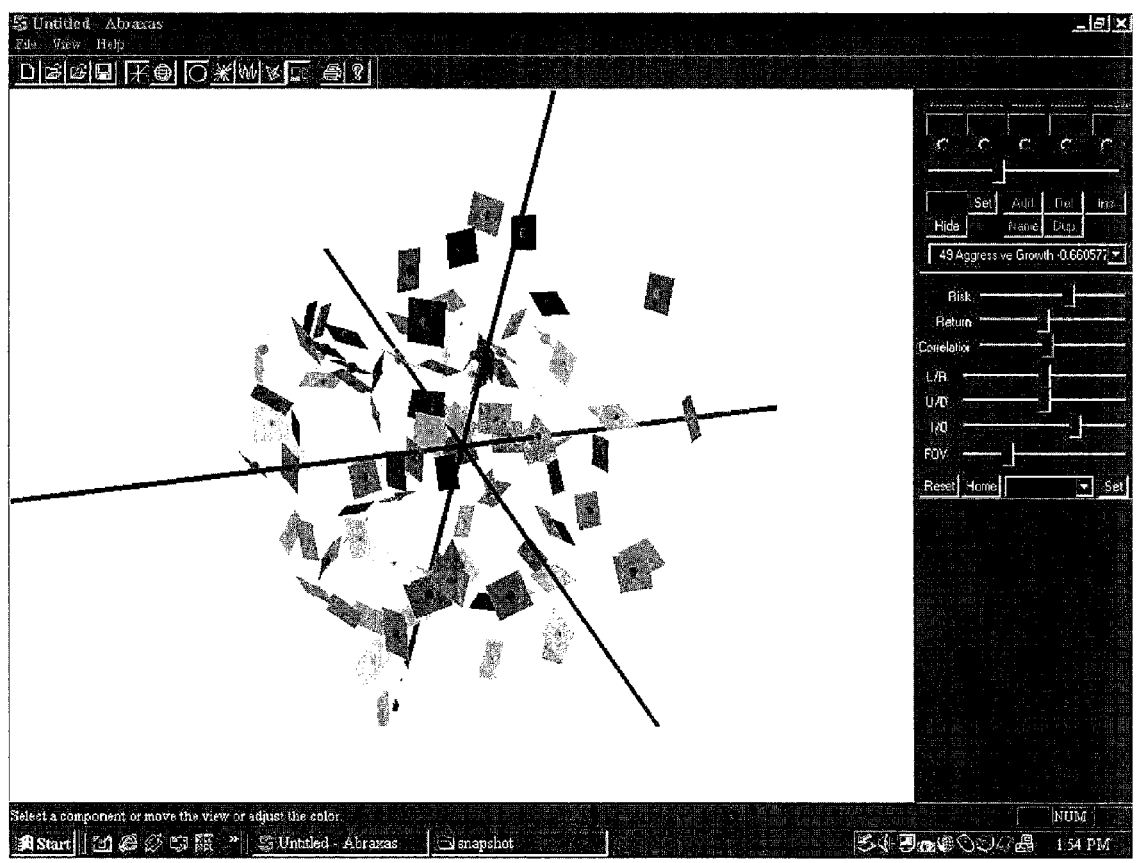
FIG. 33 shows an embodiment of the invention wherein squares represent the assets.

In one embodiment, a computer creates and displays the model. Each data-point can be represented in a large number of ways including color-coding. Data-points could also be represented according to: shape (e.g. as circles for one type of asset, triangles for another type of assets, squares for another, etc.), FIG. 33 sound (e.g. if the model is created on a computer, a pointing device moved to the location of the asset would prompt a sound to be emitted from the computer), or touch (e.g. on a computer monitor or viewing device). The computer may be capable of rotating the model so that it may be viewed from different angles. The computer is also capable of displaying the model from various locations. The computer can store and display asset-specific details available on request by the user. This can be accomplished, for example, with "right-click viewing", whereby selecting an asset with a cursor provides a menu of information on that asset. Utilizing traditional screen menus and links, a user would be able to access a wide variety of specific information from one or many sources all accessed within the viewing platform of the model.

The completed model has "volume." Assets in the model can be assigned "mass" based on any user-defined criteria including, but not limited to, each individual asset's total quantity, capitalization, or risk attributes. Since the completed model has volume and mass, it also has density. These attributes of the model could be stored in a computer-readable medium and/or displayed along with the model itself on a computer screen or display device (e.g. using "right-click viewing").

A user can create an array or slide show of asset models by creating multiple models and then briefly displaying each model at the same time or in succession, respectively. The multitude of models in an array or slide show may depict different portfolios, a single, static portfolio at different points in time, or a single portfolio as it metamorphoses over time (e.g. assets comprising portfolio change). Changes in the portfolio may be contained in the relationships of the assets, the variables of the assets, the variables depicted in the model or any combination thereof.

The process of creating the iterations of the model that form the animation may be normally derived from an entirely new optimization in which the inputted data has changed but the model of the optimization remains the same.

A portfolio animation can be created using a Monte Carlo simulation or similar methodology, depicting the dynamics of a portfolio over time and interpolating the periodic return data. The model could thus be used to depict how a portfolio responds to real or hypothetical economic events. The pliability of the model reflects the dynamic nature of correlations and other variables, and the degree to which the model holds its shape can be used to model the variance of a portfolio and depict the effects of leverage on a portfolio. The frames of a portfolio animation can be randomly selected or sorted based on any user-desired criteria.

Pliability of a portfolio model created by an embodiment of the present invention can be further illustrated by creating iterations in the primary periodic return database. The user can do this by suppressing values in the asset database and repeating the error-minimization method, thus creating a new model. Repeating this process over differing time periods creates a distribution of correlation and variable observations. The net effect of this procedure is to test the portfolio's endurance; the less physical distortion the slide show depicts, the greater the portfolio's stability.

A point and click method of drilling down into any asset within the asset universe where that asset contains components and having the components of that asset optimized and modeled in a new space spawned by the selection of that asset.

The invention contains a method of factor analysis where various economic factors are included in the graph and the sensitivity and strength of the assets relationships to these factors is depicted using distances, shapes sizes and changes in the above variables. The method of the invention providing a visual platform is well fungible with factor modeling. In traditional factor modeling, an effort is made to attribute the price movement of an asset to other components. These components are often of an economic nature. Typical factor would include GDP growth, indications of consumer sentiment, rates of inflation, the relative strength of the dollar, the difference in yield between corporate debt securities and government debt issues. Other factors could be market based, such as debt to equity ratios, price to earnings, price to book, rate of earnings growth etc.

Factor analysis is normally performs using databases and spreadsheets with little or no visual intuition. Factor analysis uses correlations of the assets against the various factors to gain an understanding of what causes an investment to change in value. This invention encompasses a method of factor analysis where in the factors are modeled in the viewing space with the portfolio.

The factors may be chosen by the user, selected from a list or determined for the user based on an analysis of the most pertinent factors for the asset universe or portfolio under analysis. Such an analysis may be performed by determining a level of significance for both positive and negative correlation values. Each potential factor is tested against the asset universe. The number, quality and quantity of significant factors are computed for each factor. This is performed for all potential factors. The factors are ranked using the criteria obtained. The ranking of the factors is also variable. A typical factor ranking would count the number of factor asset correlations that were either greater than 0.7 or less than −0.55. This provides for a total of significant factors. The factors are then ranked and the user decides the number of factors to use.

The factors are included in the optimization process. The direction of each factor is obtained using the same vector generation process employed for the assets. The distance of the factors can be determined in a variety of methods. One method is to take the largest distance of any asset vector and add a fixed number to that distance, then use the summation as the factor vector length. Another method is to determine the factor distance as a function of the factor strength with the asset universe. The preferred method is to assign a greater distance the more the factor has a positive relationship to the asset universe. The factors that are selected are consequently scaled in a manner that equates the strength of the factor to that factors distance, and makes the relationship relative for all factored modeled.

The factor model displays changes as they impact the factors and the assets. Given a change in one of the factors, the asset universe can shift by readjusting the distances of the assets to the factor. The degree of change in may be proportional to the strength of the factor. For example, assume the following information. The inflation rate is a factor. It increased 1%. The rate of inflation had a 0.6 correlation to asset QA, a 0.9 correlation to asset QB and a −0.4 correlation to QT. In this embodiment, assets QA and QB each shift towards the factor plot location. QA shifts less than QB due to a weaker factor strength. Asset QT shifts in the opposite direction by a magnitude proportional to the factor strength.

Assets preferably shift to the factor in a linear or direct fashion. However, assets may shift in non-linear fashion. This may occur if it helped to retain the integrity of the relationship with the other assets, or with the variables selected as the model axes.

The result of the new model is a new asset allocation, and a modified portfolio representation. The process may be repeated for all of the factors modeled. The factors may be adjusted by the user in an effort to learn the impact of the portfolio.

A method of the invention creates simulations by varying one or more of the inputs. The input variations may include the factor strength or the change of the factor for any combination of assets and factors.

It is a method of the invention that this simulations may be depicted in an order so that an animation of the model results. The order may be chronological, random, or based on a ranking of the factor attributes or portfolio performance.

It is a further method of the model that the variations of the factors and their relationships to the assets in the model universe may be sampled in a Monte Carlo method. This results in obtaining a number of different simulations. Information about the probability of the portfolio performance can be ascertained from the collection of the various samples.

One embodiment of the invention includes a lead or lag time when determining the relationship of the factors to the assets. For example, a user may analyze the impact of a change in GDP to the price of asset QT two months after the observation of the factor. Experimenting with different lead and lag times helps investors to better understand the relationships embedded in economic systems. Some powerful and predictable relationships can be discovered using mismatched time periods. The visual platform facilitates the discovery of such relationships. Another embodiment for factor modeling occurs as the above factoring system wherein the changes in the modeled variables are derived using simulated gravity.

A system of automatic trade order generation based on dynamic representation of a portfolio and the physical distortions of the portfolio and components thereof wherein a trade signal is generated when a distortion or movement is equal or larger than a defined amount.

In another embodiment of the invention, a system may illuminate assets with specific characteristics (a specific counter party or statistical threshold).

A method of comparison that simultaneously graphs two portfolios. The portfolios can be distinguished using different colors and different levels of opacity.

A method of portfolio optimization visualization wherein the error component associated with each asset and its relative location in space is relocated in a manner that displays the location of that asset as if there were no error in the relationships. The error visualization may occur staged per user-defined criteria such as a per asset basis, an error ranking system or a simultaneous depiction. This causes the model to alter its shape. The greater the shape alteration and gyrations the greater error the optimization process has generated.

Portfolio optimizations are prone to error and sometimes small changes in the inputs can create dramatically different results. This visualization technique provides the user with a fast and lucid intuition of the magnitude of the errors so that they can make better decisions and prepare for contingencies resulting from deviations between the model and the actual results.

The invention models all portfolios whether real or hypothetical. When modeling a portfolio that is inefficient but real, the model may simultaneously show both the real portfolio and the hypothetical efficient portfolio. The portfolios can be simultaneously displayed using a system of opacity wherein the efficient portfolio is graphed over the real portfolio but appears opaque, permitting both to be seen. Under such circumstances the real portfolio is displayed but forming a skin (convex hull) around the assets that are included in the present allocation.

The invention facilitates the inclusion of an asset suggestion function. A user who has defined an asset universe and built a model portfolio but who was unsatisfied with the overall balance achieved could summon a suggestion function. The suggestion function then searches databases outside of the defined investment universe. The search may be enhanced by a correlation scoring and matching process that discovers the deficiencies of the portfolio based on the presence of assets with similar correlation attributes.

Composite distance measures may be substituted for one or more axis. A composite distance measurement can take the scaled or unscaled values of any variable selected. When using composite distances the user may include as many variables as they desire. For example, one of the models' axes could consist of 20% earnings growth, 20% expected return, 10% price to earnings, 10% price to book, 20% relative strength index and 20% based on a qualitative score assessed after meeting with the companies management. Each score is scaled prior to amalgamation.

A method of the invention consists of a modeling technique wherein vector lengths grow incrementally with sequential modeling using the prior position as a starting point. Rather than computing an entire new vector from the origin for each instance of the model, a user may grow the vectors adding or subtracting an amount of distance to reflect the incremental change in each asset with respect to the axes. The direction of the movement also embodies the correlations or relationships. When the model depicts the changes in correlation as well as distance, the correlations are determined by one of the model and optimization processes described above. The model may take the present locations as the starting point to generate the new asset universe coordinates. The location of the sequential coordinate is mapped and the distance then taken along a line connecting the original coordinate with the sequential coordinate.

Visual representation is easily understood in all languages with very little instruction or notation. Modeling a portfolio holistically allows an investor to keep their portfolio in balance and fine tune their investments for maximum performance. An ideal portfolio as modeled by one embodiment of the present invention has a symmetrical and large volume and, and matches any additional attributes as set by the user, i.e. low mass, low density, and low pliability.

The model gives an asset manager (even a novice investor) more control over a portfolio and inherently highlights the advantages of correlational portfolio diversification. Asset managers could run tests to determine if a proposed trade would increase or decrease their anticipated returns and risk level.

What is claimed is:

1. A graphical simulator comprising a computerized processor wherein said computerized processor is configured to:
   a. accept an asset universe wherein said asset universe comprises at least two assets;
   b. construct a correlation relationship matrix for said asset universe wherein said relationship matrix depicts a quantification of a relationship between each of said at least two assets
   c. determine a vector for each of said at least two assets based on said correlation relationship matrix; and
   d. plot each of said at least two assets to create a model of said asset universe wherein said model illustrates how said at least two assets perform relative to one another via an angle indicative of the relationship between the assets,
   e. determine a distance component from a point of origin for each asset in said asset universe wherein a longer distance is calculated for a more attractive asset.

2. A graphical simulator as claimed in claim 1 wherein said computerized processor calculates said vectors for said asset universe so that
   a. a set of assets in said asset universe with a positive correlation value appear closer to each other in said model; and
   b. a set of assets in said asset universe with a negative correlation value appear in opposition to each other in said base model.

3. A graphical simulator as claimed in claim 2 wherein said vectors may be scaled according to a set of predetermined criteria.

4. A graphical simulator as claimed in claim 3 wherein said computer processor generates a surface for said model.

5. A graphical simulator as claimed in claim 4 wherein said graphical simulator further comprises a computerized display device in communication with said computer processor and wherein said computer processor creates a second model associated with a second asset universe and communicates said second model to said computerized display device to be simultaneously displayed on said computerized display device with said model.

6. A graphical simulator as claimed in claim 5 wherein said second asset universe comprises an historical asset universe.

7. A graphical simulator as claimed in claim 4 wherein said graphical simulator further comprises a computerized display device in communication with said computer processor and wherein said computer processor creates a second model associated with a second asset universe and communicates said second model to said computerized display device to be successively displayed on said computerized display device.

8. A graphical simulator as claimed in claim 4 wherein said graphical simulator further comprises a computerized display device in communication with said computer processor and wherein said computer processor creates a second model associated with a second asset universe and communicates said second model to said computerized display device to overlay a display associated with said model with a display of said second model.

9. A graphical simulator comprising a computerized processor and a display device in communication with said computerized processor wherein said computerized processor is configured to:
   a. accept an asset universe wherein said asset universe comprises at least two assets;
   b. construct a relationship matrix for said asset universe wherein said relationship matrix depicts a correlation computed from a correlation formula wherein said correlation formula measures the performance of each of said at least two assets from said asset universe relative to each other
   c. compute a set of vector components between each of said at least two assets in said asset universe wherein said vector components are derived from said relationship matrix for each of said at least two assets in relation to each other;
   d. adjust said vector components to conform to a set of predefined constraints;
   e. communicate said vector components associated with each of said at least two assets to said display device to display a model of said asset universe wherein said model illustrates how said at least two assets perform relative to one another via an angle indicative of the relationship between the assets,
   f. determine a distance component from a point of origin for each asset in said asset universe wherein a longer distance is calculated for a more attractive asset.

10. A graphical simulator as claimed in claim 9 wherein said processor is configured to adjust the view of said model.

11. A graphical simulator as claimed in claim 10 wherein said computerized processor is further configured to generate a surface on said model's exterior and to determine a volume associated with said model.

12. A graphical simulator as claimed in claim 11 wherein said computerized processor is further configured to color-code said generated surface.

13. A graphical simulator as claimed in claim 12 wherein said computerized processor is configured to permit selection of any given asset in said model and to create a model displaying a set of correlative values for a set of attributes associated with said given asset.

14. A graphical simulator as claimed in claim 13 wherein said computerized processor is further configured to accept additional data regarding said asset universe and create an animated series of models illustrating a set of differences between a first model and a set of additional models.

15. A graphical simulator as claimed in claim 9 wherein said model is displayed in a three-dimensional space.

16. A graphical simulator comprising a computerized processor and a display device in communication with said computerized processor wherein said computerized processor is configured to:
   a. accept a resource universe wherein said resource universe comprises at least two resources;
   b. construct a relationship matrix for said resource universe wherein said relationship matrix depicts a correlation computed from a correlation formula wherein said correlation formula measures the correlation between each of said at least two assets from said resource universe relative to each of said other resources from said resource universe;
   c. compute a set of vector components between each of said at least two resources in said resource universe wherein said vector components are derived from said relationship matrix for each of said at least two resources in relation to each other;
d. adjust said vector components to conform to a set of predefined constraints;
e. communicate said vector components associated with each of said at least two resources to said display device to display a model of said resource universe wherein said model illustrates how said at least two assets perform relative to one another via an angle indicative of the relationship between the assets
f. determine a distance component from a point of origin for each asset in said asset universe wherein a longer distance is calculated for a more attractive asset.

17. A computer implemented method of selecting a set of assets comprising an efficient set comprising the steps of
a. selecting an asset universe wherein said asset universe comprises at least two assets;
b. constructing a correlation relationship matrix for said asset universe wherein said relationship matrix depicts a relationship quantification between each of said at least two assets from said asset universe relative to each of said other assets from said asset universe;
c. solving a system of equations to determine a vector or coordinate for each of said at least two assets based on said relationship matrix;
d. scaling said vector or coordinate for each of said at least two assets against a set of selected variables;
e. plotting said vector or coordinate to create a model representing said asset universe wherein said model illustrates how said at least two assets perform relative to one another via an angle indicative of the relationship between the assets;
f. determining an exterior for the model;
g. determining an efficient set by selecting a set of assets wherein each asset in said set of assets comprises a set of coordinates which are located on the exterior of the model,
h. determining a distance component from a point of origin for each asset in said asset universe wherein a longer distance is calculated for a more attractive asset.

18. A computer implemented method of determining an efficient allocation for a set of assets comprising the steps of:
a. selecting an asset universe wherein said asset universe comprises at least two assets;
b. constructing a relationship matrix for said asset universe wherein said relationship matrix depicts a relationship quantification between each of said at least two assets from said asset universe relative to each of said other assets from said asset universe;
c. determine a vector or coordinate for each of said at least two assets based on said relationship matrix;
d. scaling each said vector or coordinate for each of said at least two assets according to a set of predefined criteria;
e. creating a model from said vector or coordinate for each of said at least two assets wherein said model illustrates how said at least two assets perform relative to one another via an angle indicative of the relationship between the assets;
f. determining an exterior surface for said model;
g. determining a set of assets associated with a set of coordinates which are substantially located on said exterior surface of said model;
h. re-allocating a set of resources associated with each of said at least two assets to produce said efficient allocation,
i. determining a distance component from a point of origin for each asset in said asset universe wherein a longer distance is calculated for a more attractive asset.

19. A graphical simulator as claimed in claim 1 wherein said computerized processor is further configured to display a correlation structure of said asset universe.

20. A graphical simulator as claimed in claim 19 wherein said computerized processor is further configured to contrast said correlation structure again a symmetrical object to illustrate whether said asset universe is optimally allocated.

* * * * *